(12) United States Patent
Segall

(10) Patent No.: US 10,325,524 B2
(45) Date of Patent: Jun. 18, 2019

(54) LATERAL CANTHOTOMY AND CANTHOLYSIS SIMULATION DEVICE

(71) Applicant: Stuart Charles Segall, La Jolla, CA (US)

(72) Inventor: Stuart Charles Segall, La Jolla, CA (US)

( * ) Notice: Subject to any disclaimer, the term of this patent is extended or adjusted under 35 U.S.C. 154(b) by 263 days.

(21) Appl. No.: 15/345,008

(22) Filed: Nov. 7, 2016

(65) Prior Publication Data
US 2017/0132953 A1 May 11, 2017

Related U.S. Application Data

(60) Provisional application No. 62/252,458, filed on Nov. 7, 2015.

(51) Int. Cl.
*G09B 23/28* (2006.01)
*G09B 23/34* (2006.01)

(52) U.S. Cl.
CPC .................................. *G09B 23/34* (2013.01)

(58) Field of Classification Search
CPC ......... G09B 23/28; G09B 23/30; G09B 23/34
USPC .......................... 434/262, 267, 270, 271, 272
See application file for complete search history.

(56) References Cited

U.S. PATENT DOCUMENTS

| | | |
|---|---|---|
| 2,213,270 A | 9/1940 | Chase |
| 2,752,697 A | 7/1956 | Lawall |
| 3,027,655 A | 4/1962 | Alderson |
| 3,852,893 A | 12/1974 | Smrcka |
| 4,209,919 A | 7/1980 | Krikae et al. |
| 4,221,975 A | 9/1980 | Ledniczi et al. |
| 4,331,426 A | 5/1982 | Sweeney |
| 4,439,162 A | 3/1984 | Blaine |
| 4,531,919 A | 7/1985 | Ware |
| 4,773,865 A | 9/1988 | Baldwin |
| 5,104,328 A | 4/1992 | Lounsbury |
| 5,305,181 A | 4/1994 | Schultz |
| 5,397,237 A | 3/1995 | Dhont et al. |
| 5,411,437 A | 5/1995 | Weber et al. |
| 5,634,797 A | 6/1997 | Montgomery |
| 5,823,787 A | 10/1998 | Gonzales et al. |
| 5,990,625 A | 11/1999 | Meissner et al. |
| 5,995,077 A | 11/1999 | Wilcox et al. |
| 6,057,540 A | 5/2000 | Gordon et al. |
| 6,234,804 B1 | 5/2001 | Yong |
| 6,780,016 B1 | 8/2004 | Toly |
| 6,984,208 B2 | 1/2006 | Zheng |
| 7,021,940 B2 | 4/2006 | Morris et al. |
| 7,810,504 B2 | 10/2010 | Guzman |
| 7,850,456 B2 | 12/2010 | Chosack et al. |
| 7,857,626 B2 | 12/2010 | Toly |
| 7,887,330 B2 | 2/2011 | King |
| 7,963,770 B2 | 6/2011 | Kukora et al. |

(Continued)

*Primary Examiner* — Kurt Fernstrom

(57) ABSTRACT

The Lateral Canthotomy and Cantholysis Simulation Device of the present invention includes a base with a depression to receive a simulated eye, a skin covering having an eye opening with an upper lid and a lower lid, a band having a first end and a second end that is removably attached to the base under said skin covering, where the band is under tension between the first end and the second end to simulate a canthal tendon. The skin covering may also be formed with a preformed incision at the junction between the upper lower lid to simulate a preformed lateral canthotomy.

20 Claims, 14 Drawing Sheets

(56) References Cited

U.S. PATENT DOCUMENTS

| | | | |
|---|---|---|---|
| 7,967,679 B2 | 6/2011 | Ombrellaro et al. | |
| 8,262,666 B2 | 9/2012 | Biegun | |
| 8,342,852 B2 | 1/2013 | King | |
| 8,382,485 B2 | 2/2013 | Bardsley et al. | |
| 8,840,403 B2 | 9/2014 | Segall | |
| 9,017,080 B1 | 4/2015 | Placik | |
| 2004/0126746 A1 | 7/2004 | Toly | |
| 2007/0218438 A1 | 9/2007 | Sanders et al. | |
| 2007/0243512 A1 | 10/2007 | King | |
| 2008/0167398 A1 | 7/2008 | Patil et al. | |
| 2008/0187896 A1* | 8/2008 | Savitsky | G09B 23/28 434/272 |
| 2009/0246747 A1 | 10/2009 | Buckman, Jr. | |
| 2009/0291421 A1 | 11/2009 | Duprez et al. | |
| 2009/0298034 A1 | 12/2009 | Parry et al. | |
| 2011/0060555 A1 | 3/2011 | Koehler et al. | |
| 2013/0078604 A1 | 3/2013 | King | |
| 2014/0017650 A1 | 1/2014 | Romero | |
| 2015/0037775 A1* | 2/2015 | Ottensmeyer | G09B 23/34 434/271 |
| 2015/0279239 A1* | 10/2015 | Chang | G09B 23/30 434/271 |
| 2016/0063898 A1* | 3/2016 | Bernal | G09B 23/32 434/271 |

\* cited by examiner

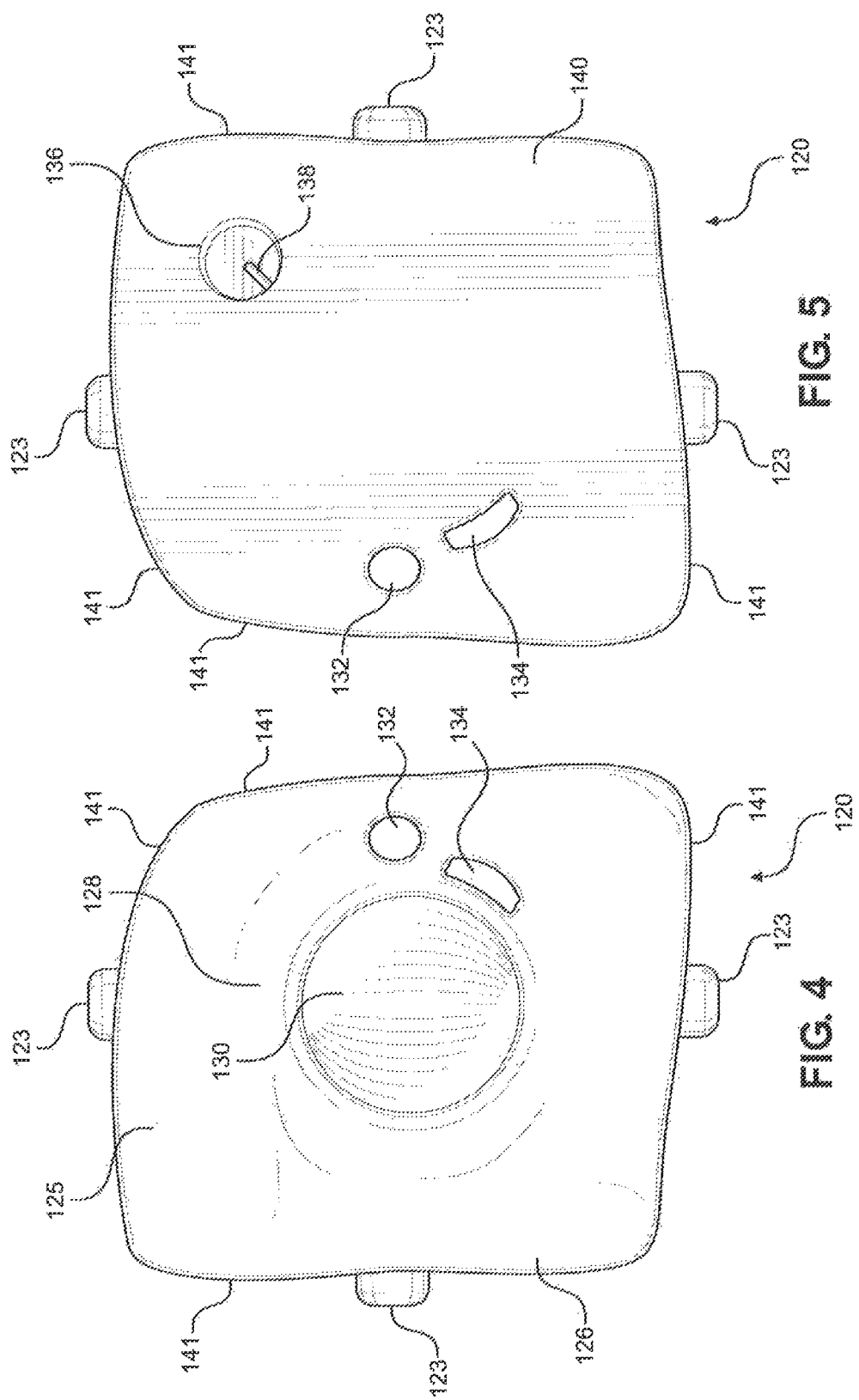

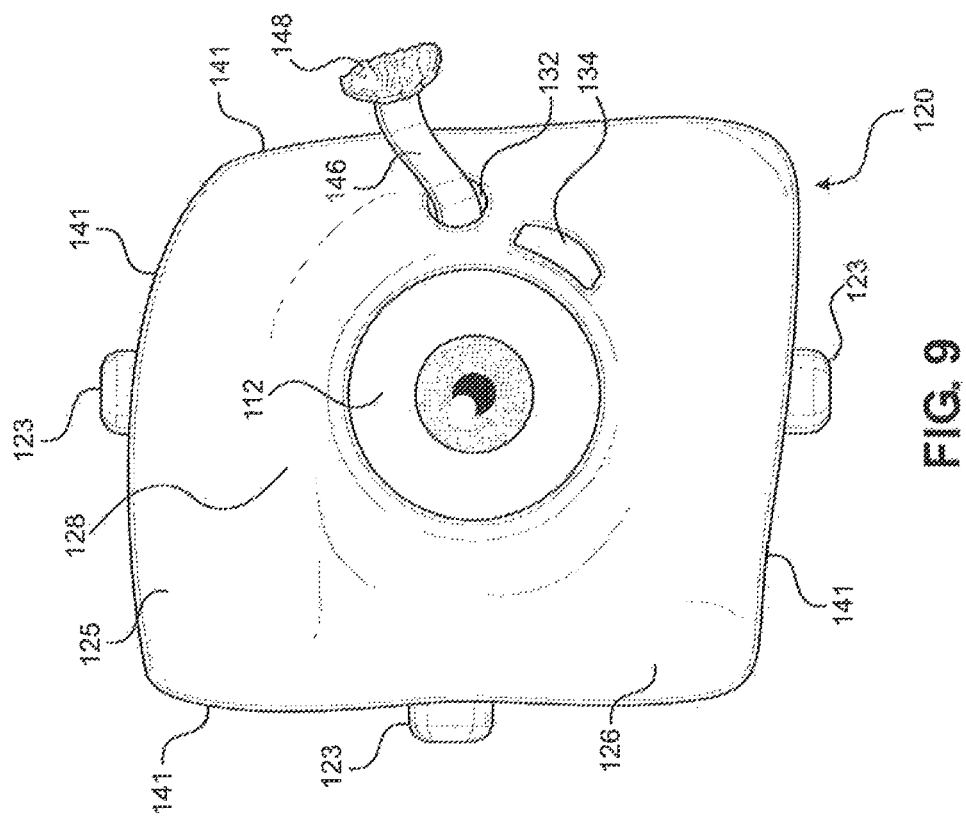
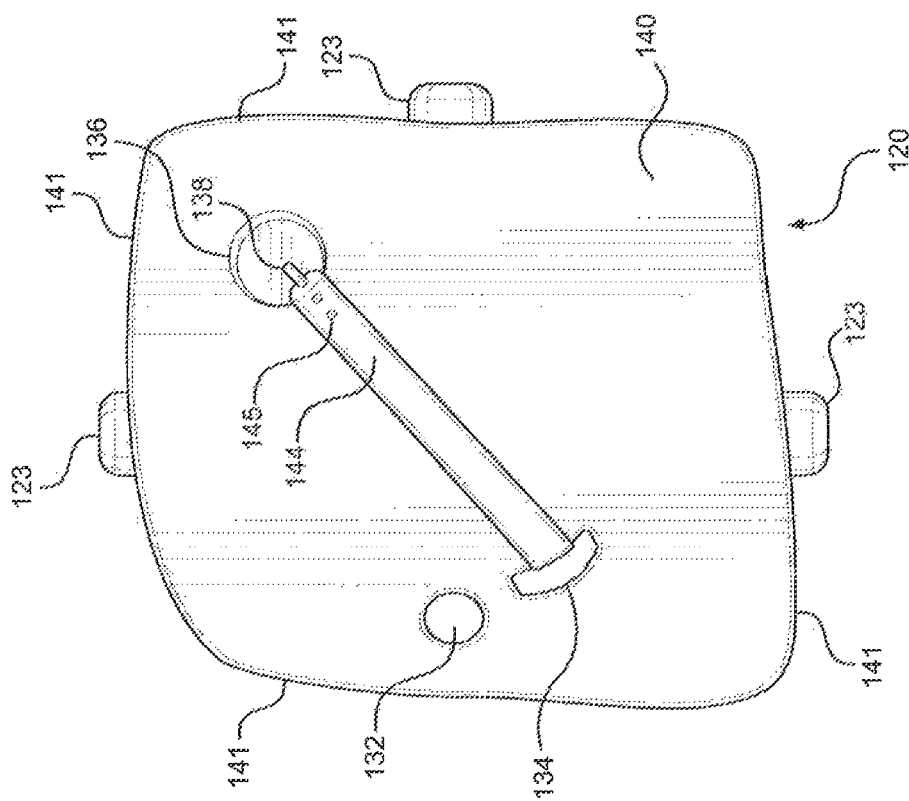

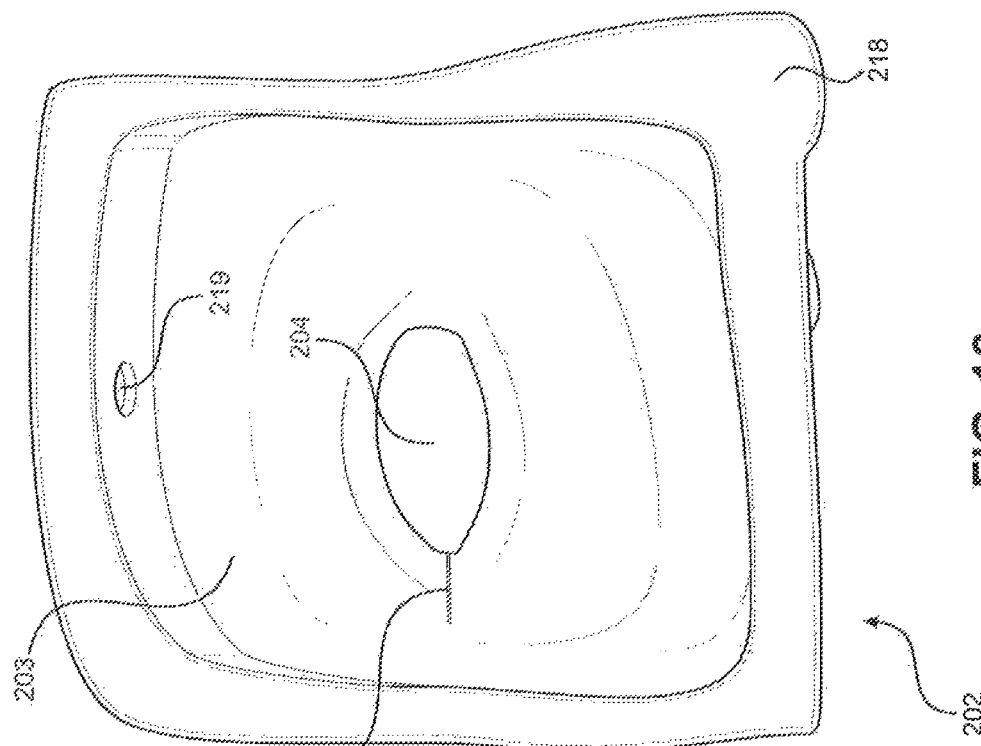
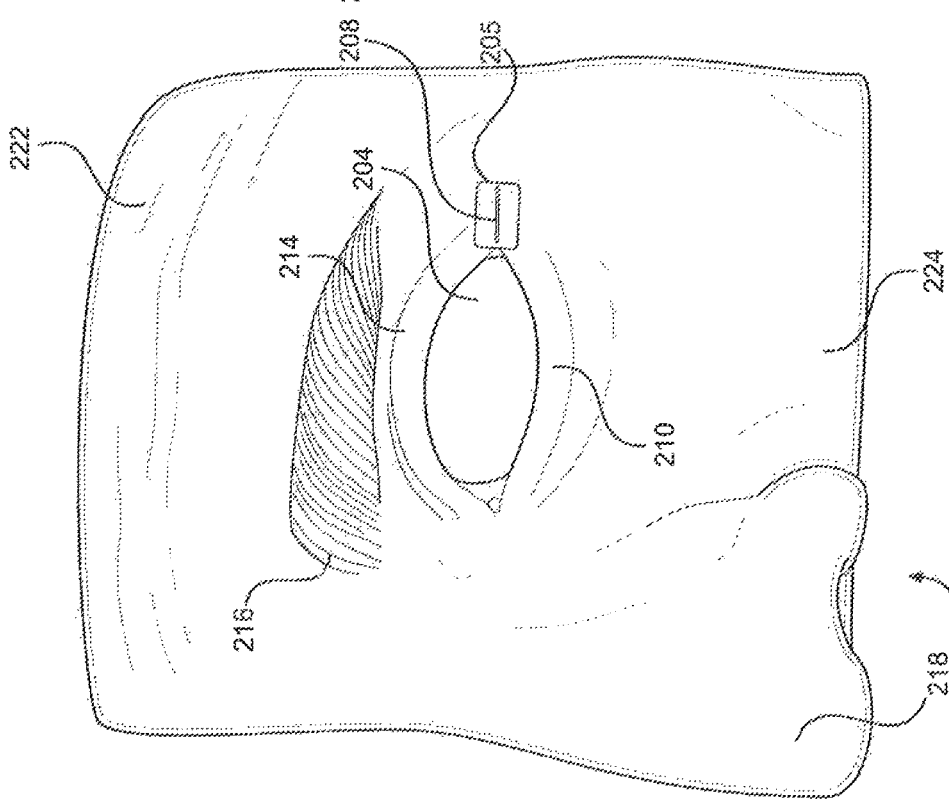

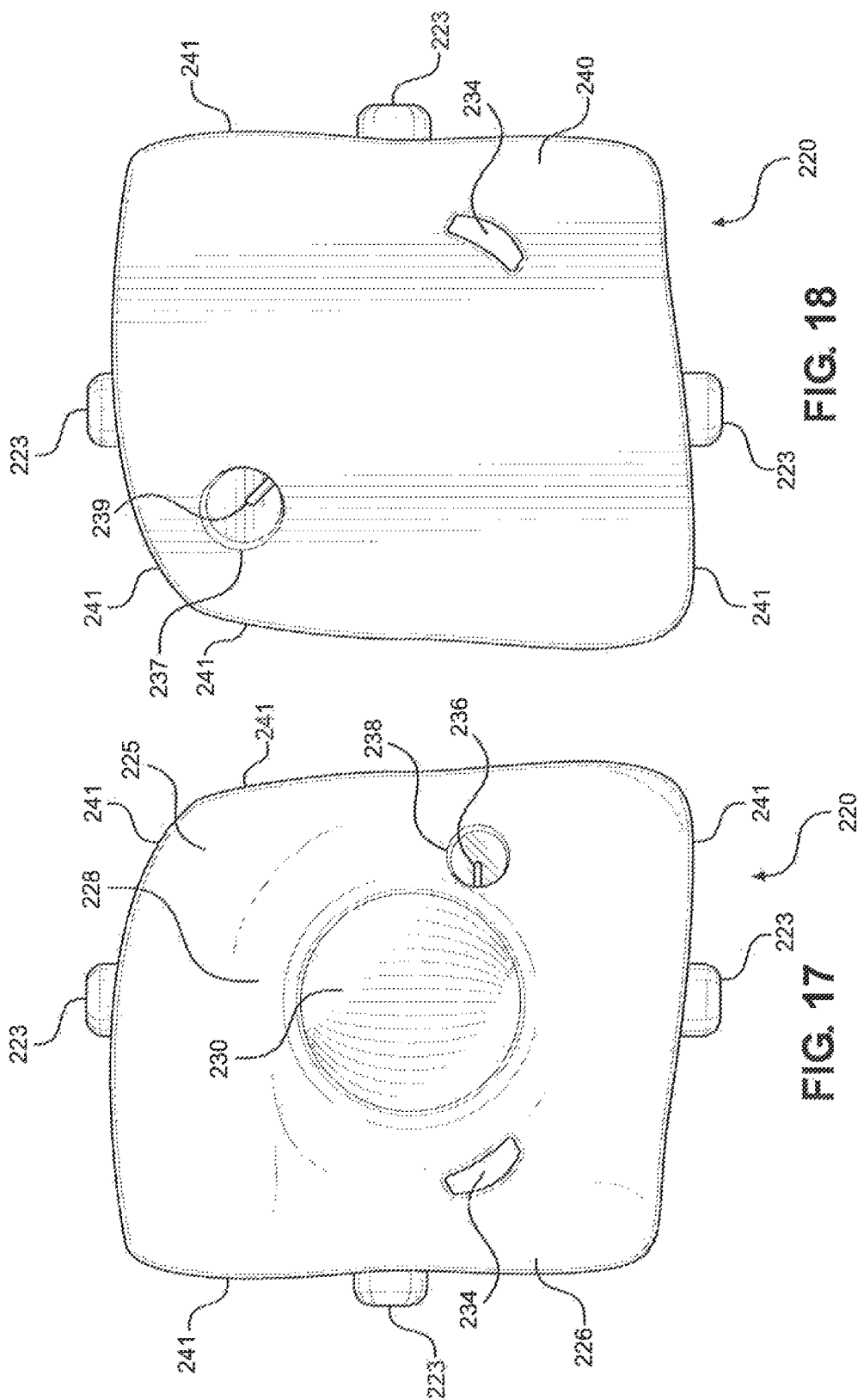

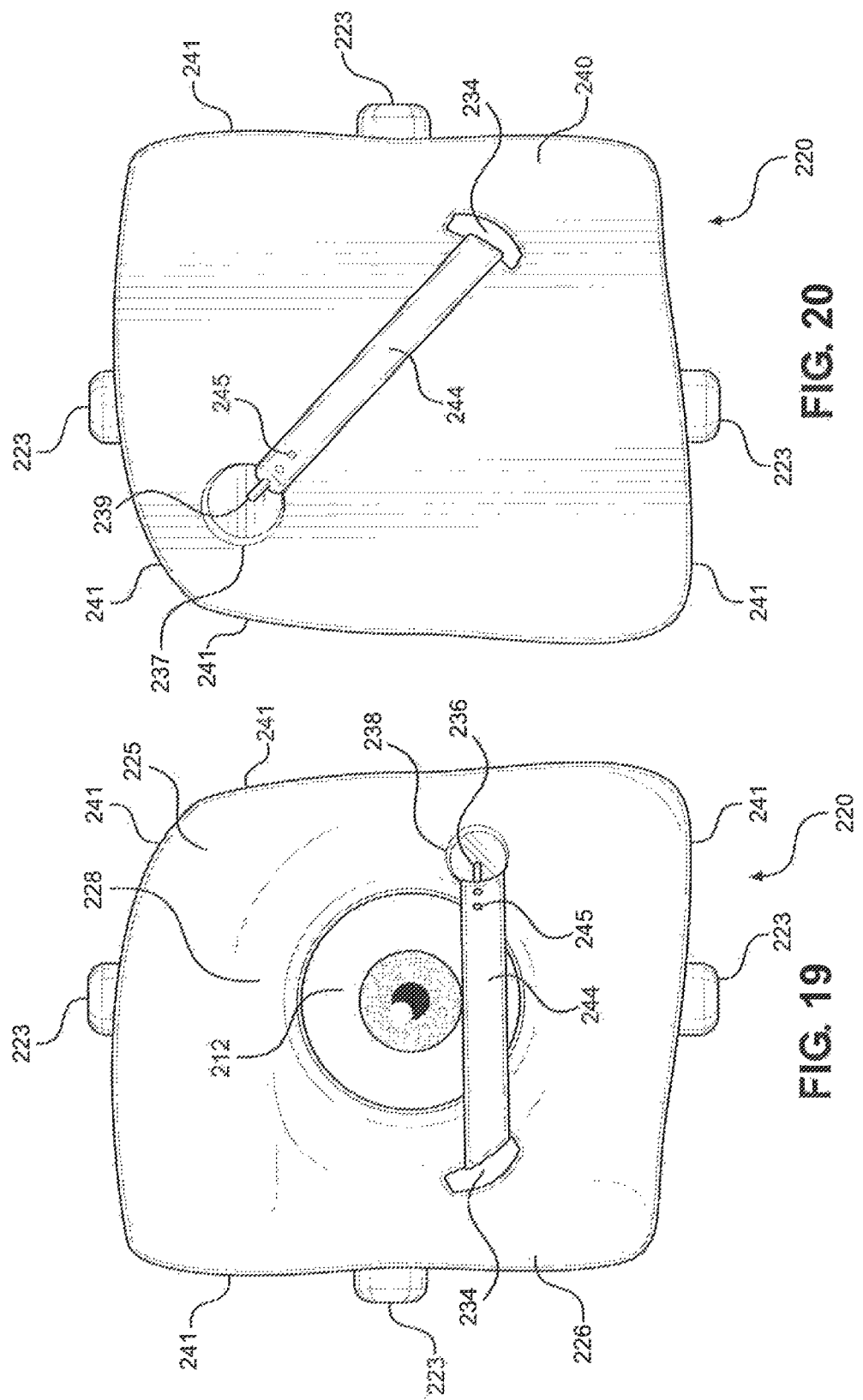

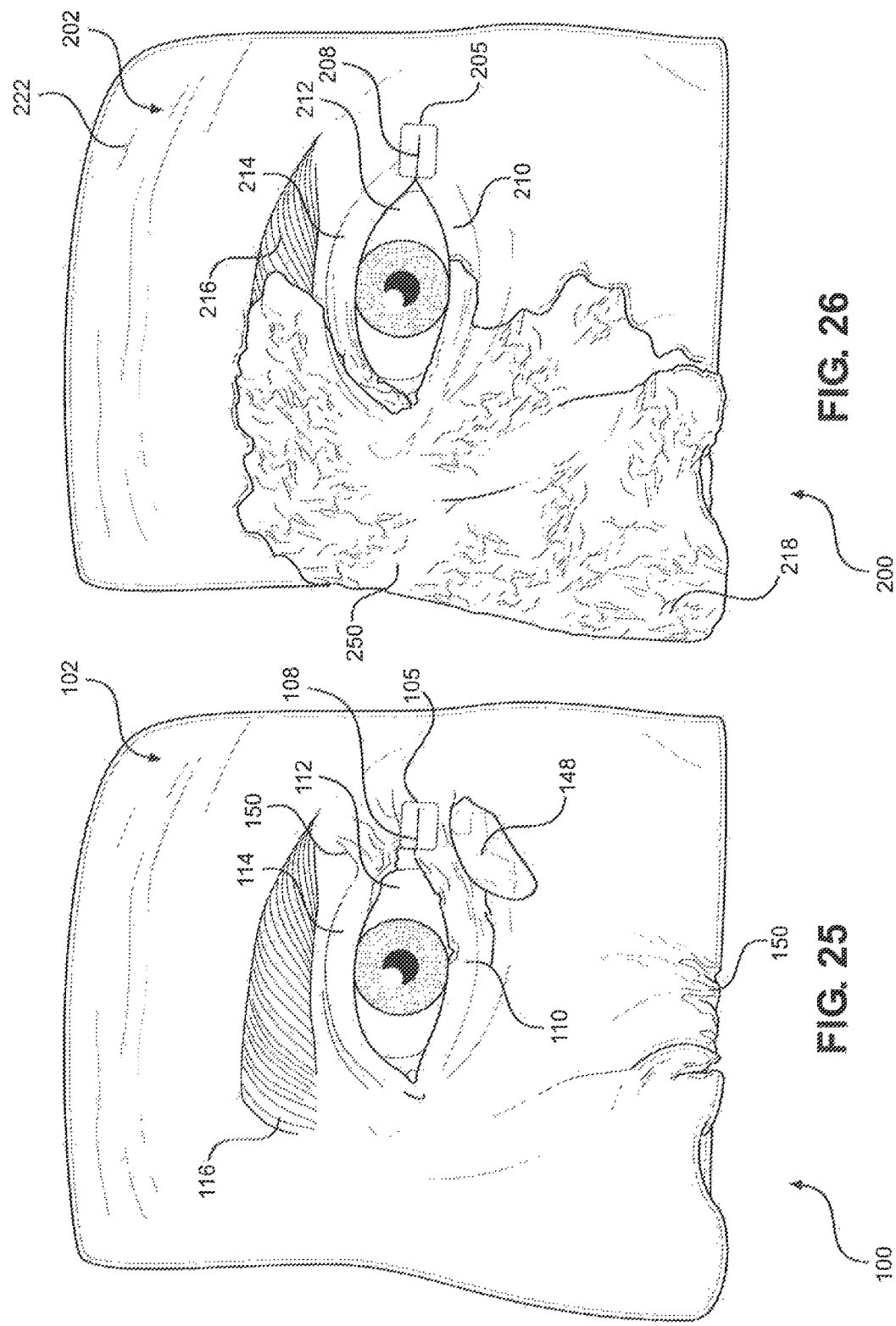

LATERAL CANTHOTOMY AND CANTHOLYSIS SIMULATION DEVICE

RELATED APPLICATION

The present application claims the benefit of priority to U.S. Provisional Application No. 62/252,458 filed on Nov. 7, 2015, which is currently co-pending.

FIELD OF THE INVENTION

The present invention pertains generally to a device for use in the area of emergency medical training. More specifically, the present invention pertains to a device that can be used to provide simulated field training for the treatment of vision-threatening ocular hemorrhages. The present invention is particularly, but not exclusively, useful as a simulation device to simulate emergency treatment of ocular hemorrhages by a lateral orbital canthotomy and cantholysis of the inferior canthal tendon.

BACKGROUND OF THE INVENTION

The human eye is a photosensitive organ that focuses and converts light into electrical impulses. The human eye is a slightly asymmetrical globe, roughly an inch in diameter, with the size differing by only a few millimeters among adults. The eye consists of two parts. The smaller front section of the eye comprises the iris, cornea, pupil, sclera, and the lens. The iris is the pigmented area of the eye that surrounds the pupil, which is a black circular opening that allows light into the eye. The sclera is the white area surrounding the iris. The iris, sclera, and pupil are covered by a clear dome called the cornea. Located behind the pupil is a lens, which focuses light to the back of the eye.

The back of the eye consists of a large chamber. The inside lining of the chamber is covered by a network of light sensing cells that are collectively called the retina. Leading posteriorly away from the eye is the optic nerve. Light enters through the pupil and is focused by the lens to the retina. The retina converts the light into electrical impulses, which are then transmitted to the brain via the optic nerve.

The eye is positioned in the orbit, which is a cavity or socket of the skull. Seven bones conjoin to form the orbital structure and together are shaped like a quadrilateral pyramid. The eye is essentially suspended within the orbit and there are six muscles of the orbit that attach to the eye to facilitate movement. The lateral and medial canthal tendons attach the eyelids to the orbital rim and prevent the eye from having any forward displacement away from the eye socket.

There are many circumstances in which the eyes may be damaged, resulting in a loss of vision. A blunt impact to the eye may potentially damage the structures located in the "front" of the eye (such as the cornea, sclera, iris and lens) or to the back of the eye (the retina and the optic nerve). When a blunt impact to the eye occurs a hematoma may form. A hematoma, or localized collection of blood outside blood vessels, may develop in the tissue surrounding the eye and is commonly referred to as a "black eye." With minor injuries like a black eye, pooled blood usually drains towards the bottom of the eye after several days and no loss of vision occurs.

However, in some situations a blunt force can cause an orbital hemorrhage. A hemorrhage, in contrast with a hematoma, generally refers to a broken and bleeding blood vessel. The bleeding may occur internally or externally. In an orbital hemorrhage, the post-septal orbital space located behind the eye can accumulate blood, building pressure behind the eye. As discussed above, the orbital space is formed from seven bones that shape the socket and therefore, the accumulation of blood cannot expand posteriorly. As a result, anterior expansion occurs, causing proptosis (the forward displacement of the eye). Essentially, as the orbit fills with blood, the eye is pushed forward and out of the eye socket. However, the eye is tethered by the optic nerve and various tendons (including the lateral and medial canthal tendons). As pressure builds, the ophthalmic artery, which supplies oxygenated blood to all structures within the orbit, is compromised and results in a vision-threatening, acute orbital compartment syndrome (OCS). The optic nerve may also be damaged by the direct pressure of the fluid building in the orbit and the compression of the vascular supply to the optic nerve. In addition, the retina may be damaged by prolonged retinal ischemic (restriction of blood supply to the retina). Without prompt and proper care, the optic nerve and the retina may be damaged beyond recovery in as little as 90-120 minutes.

To treat acute OCS, orbital decompression must take place in order to avoid damage to sensitive orbital contents, like the optic nerve. The most common method of orbital decompression is by preforming a canthotomy and cantholysis of the inferior lateral canthal tendon that secures the lower eyelid to the orbital rim and prevents forward displacement of the eye.

In ideal situations, an ophthalmologist will perform the procedure in a hospital or other emergency medical facility. However, in many cases due to the time sensitive nature of the injury, many emergency room physicians have to perform a lateral canthotomy and cantholysis without an ophthalmologist.

In military or combat situations in remote areas, an ophthalmologist, hospital, or other emergency medical facility is likely unavailable. Due to the importance of prompt medical care to avoid any lasting damage to the patient's vision, the proper training of medical personnel would be beneficial to give on-site treatment in remote areas.

SUMMARY OF THE INVENTION

The Lateral Canthotomy and Cantholysis Simulation Device of the present invention provide training for professionals in the field to minimize irreversible damage and loss of vision when lateral canthotomy and cantholysis in a medical facility is not available.

The Lateral Canthotomy and Cantholysis Simulation Device of the present invention includes a base, a skin covering that mimics a partial face, and a first band attached on one end to an anchor, which may be formed to resemble debris, skin, hair or other objects. The base is substantially square in shape and formed with a brow bridge, nose bridge, and multiple openings.

In a preferred embodiment of the Lateral Canthotomy and Cantholysis Simulation Device of the present invention, the front of the base is formed with a depression to receive a simulated eye. One (1) circular and one (1) rectangular opening are formed into the base to the bottom right of the depression. The back of the base is formed with a bore and peg located in the upper right corner of the back of the base. The peripheral sides of the base are formed with detents used for securing the simulated skin covering.

The simulated skin covering includes a partial nose, brow, upper and lower eyelids, partial forehead, and partial cheek. The skin covering may also depict various wounds, such as cuts, burns, scrapes, etc. As with a real human eye, the skin covering does not cover the simulated eye entirely. Instead, the simulated eye is partially covered by the upper and lower eyelids of the skin covering. Indents to receive the detents from the base are also formed into the skin covering. The skin covering covers the base of the Lateral Canthotomy and Cantholysis Simulation Device of the present invention, including the peripheral sides of the base, but leaves the back of the base exposed. The skin covering is also formed with two (2) openings, corresponding to the circular and rectangular openings of the base, and a preformed incision.

To use the Lateral Canthotomy and Cantholysis Simulation Device of the present invention, a simulated eye is attached to the depression on the front of the base. The skin covering is placed over the base with the eye exposed. The end of first band not attached to simulated debris is threaded through the opening in the skin covering that corresponds to the rectangular opening located on the base at the bottom right of the simulated eye. The simulated debris is larger than both the opening formed into the skin covering and the rectangular opening on the base. Thus, simulated debris acts as an anchor, allowing the band to be stretched and secured to simulate tension like a tendon.

The first band is then pulled through the rectangular opening, exiting out of the back of the base. The first band is pulled and then secured on the peg located in the bore on the exposed back of the base. The first band is formed with multiple holes in order for the peg to secure the band.

The skin covering is also formed with a preformed incision in the lateral area of the eye. The preformed incision is covered with an adhesive strip. The adhesive strip allows the user to simulate a lateral canthotomy without cutting the skin covering directly, allowing the skin covering to be used multiple times.

A second band may also be threaded through the circular opening to simulate a different injury closer to the eye. The simulated face covering is placed over the base with the eye exposed. The second band is threaded through the opening in simulated skin covering that corresponds to the circular opening located on the base at the bottom right of the simulated eye. The simulated debris is larger than both the opening formed into the skin covering and the circular opening on the base. Thus, the simulated debris is anchored to the skin covering by the second band.

The second band exits through the circular opening on the back of the base and is then pulled to create tension to simulate the lateral canthal tendon. The second band is then secured on the peg located in the bore on the exposed back of the base. The second band is formed with multiple holes used to secure the band to the peg.

To perform the lateral canthotomy, the user uses tweezers to slightly pull away the lower lid of the skin covering and cut the adhesive strip along the preformed incision using blunt tipped scissors, if available. This simulates the lateral canthotomy, which is performed by cutting horizontally from the lateral part of the eyelid to the bony margin of the orbital rim.

To simulate performing a cantholysis, the user would take the tweezers to pull the lower eyelid away from the skin covering. Pulling the lower eyelid away from base, would expose first band in a tensioned state. The user then uses the same scissors to cut first band, simulating the cutting of the lateral canthal tendon. The same procedure would be used if the second band were used with the circular opening.

After use, the band and adhesive strip can be replaced, allowing the Lateral Canthotomy and Cantholysis Simulation Device of the present invention to be used repeatedly.

In another embodiment of the Lateral Canthotomy and Cantholysis Simulation Device of the present invention, the base is formed with a depression to receive a simulated eye, a rectangular opening located to the bottom left of the depression, and a front bore and front peg located to the bottom right of the depression. In addition, detents located on the peripheral sides of the base are used to secure the skin covering.

A band, preferably made of an elastic material, is formed with holes on each end of the band. One end of the band is secured on the front peg. The other end of the band is threaded through the rectangular opening and exists the opening on the back of the base. The band lies across the lower part of the simulated eye and mimics the canthal tendon. The band is secured in the back by a rear bore and rear peg located in the upper left corner of the back of the base.

The simulated skin covering includes a partial nose, brow, upper and lower eyelids, partial forehead, and partial cheek. The skin covering may also depict various wounds, such as cuts, burns, scrapes, etc. As with a real human eye, the skin covering does not cover the simulated eye entirely. Instead, the simulated eye is partially covered by the upper and lower eyelids of the skin covering. Also formed into the skin covering are indents to receive the detents from the base. The skin covering covers the base of the alternative embodiment of the Lateral Canthotomy and Cantholysis Simulation Device of the present invention, including the peripheral sides of the base, but leaves the back of the base exposed.

The skin covering is also formed with a preformed incision. The preformed incision is covered with an adhesive strip. The adhesive strip allows the user to simulate a lateral canthotomy without cutting the skin covering directly, allowing the skin covering to be used multiple times.

To perform the lateral canthotomy, the user uses tweezers to slightly pull away the lower lid of the skin covering from simulated eye and cut the adhesive strip along the premade incision using blunt tipped scissors, if available. This simulates the lateral canthotomy, which is performed by cutting horizontally from the lateral part of the eyelid to the bony margin of the orbital rim.

To simulate performing a cantholysis, the user would take the tweezers and gently peel back the lower lid of the skin covering at the preformed incision, exposing the band underneath skin covering. The other hand of the user would use scissors, to cut the exposed band. Cutting the band simulates the cutting of the lateral canthal tendon.

After use, the band and adhesive strip can be replaced, allowing the alternative embodiment of the Lateral Canthotomy and Cantholysis Simulation Device of the present invention to be used multiple times.

BRIEF DESCRIPTION OF THE DRAWING

The nature, objects, and advantages of the present invention will become more apparent to those skilled in the art after considering the following detailed description in connection with the accompanying drawings, in which like reference numerals designate like parts throughout, and wherein:

FIG. 4 is a front view of the base of the Lateral Canthotomy and Cantholysis Simulation Device of the present invention, showing a depression for receiving a simulated eye, rectangular opening, circular opening, brow bridge, nose bridge, and detents;

FIG. 5 is a back view of the base of the Lateral Canthotomy and Cantholysis Simulation Device of the present invention, showing the rectangular opening, circular opening, bore, peg, and detents;

FIG. 8 is a back view of the base of the Lateral Canthotomy and Cantholysis Simulation Device of the present invention, showing the circular opening, rectangular opening, detents, bore, and band exiting the rectangular opening and formed with holes received by the peg;

FIG. 9 is a front view of the base the Lateral Canthotomy and Cantholysis Simulation Device of the present invention, showing the brow bridge, nose bridge, simulated eye within the depression, circular opening, rectangular opening, second band inserted through the circular opening and attached to simulated debris, and detents;

FIG. 15 is a front view of the simulated skin covering of an alternative embodiment of the Lateral Canthotomy and Cantholysis Simulation Device of the present invention, showing an eye opening, simulated skin covering, upper and lower eyelids, brow, partial nose, partial forehead, partial cheek, and preformed incision with an adhesive covering;

FIG. 16 is a back view of the simulated skin covering of an alternative embodiment of the Lateral Canthotomy and Cantholysis Simulation Device of the present invention, showing the partial nose, eye opening, indent, and preformed incision;

FIG. 17 is a front view of the base of an alternative embodiment of the Lateral Canthotomy and Cantholysis Simulation Device of the present invention, showing a depression formed to receive a simulated eye, brow ridge, nose ridge, rectangular opening, detents, front bore, and front peg;

FIG. 18 is a back view of the base of the alternative embodiment of the Lateral Canthotomy and Cantholysis Simulation Device of the present invention, showing detents, rectangular opening, rear bore, and rear peg;

FIG. 19 is a front view of the base of the alternative embodiment of the Lateral Canthotomy and Cantholysis Simulation Device of the present invention, showing a brow ridge, nose ridge, simulated eye, rectangular opening, detents, front bore, and a band inserted through the rectangular opening and formed with holes received by a front peg;

FIG. 20 is a back view of the base of the alternative embodiment of the Lateral Canthotomy and Cantholysis Simulation Device of the present invention, showing a rectangular opening, detents, and band exiting the rectangular opening and formed with holes received by a rear peg;

FIG. 25 is a front view of the assembled preferred embodiment of the Lateral Canthotomy and Cantholysis Simulation Device of the present invention, showing the skin covering formed with multiple simulated injuries; and FIG. 26 is a front view of the assembled alternative embodiment of the Lateral Canthotomy and Cantholysis Simulation Device of the present invention, showing the skin covering formed with simulated burns.

DETAILED DESCRIPTION OF A PREFERRED EMBODIMENT

The present invention is a device for simulating an emergency lateral canthotomy and cantholysis in remote situations where a hospital or ophthalmologist is unavailable.

Figure 1:
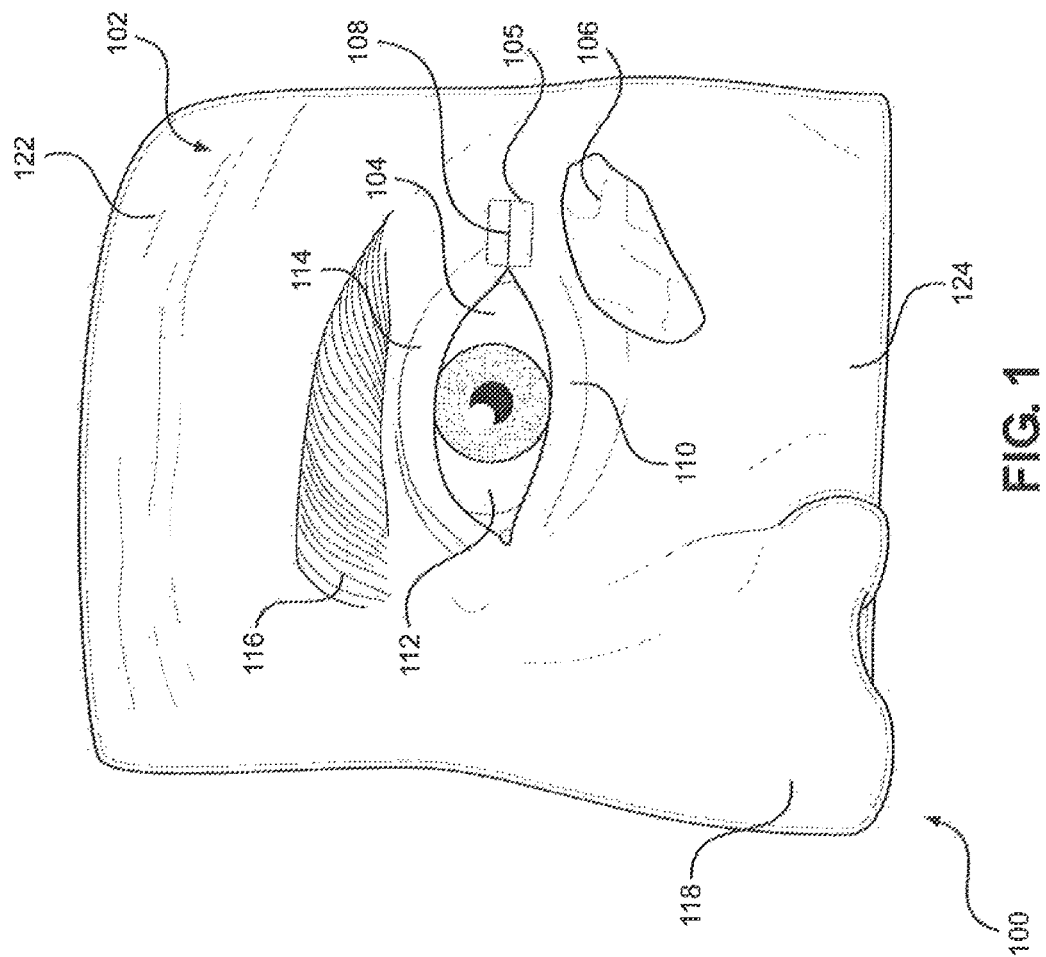
FIG. 1 is a front view of the Lateral Canthotomy and Cantholysis Simulation Device of the present invention, showing a simulated eye, skin covering, upper and lower eyelids, brow, partial nose, partial forehead, partial cheek, preformed incision with an adhesive covering, and simulated debris.

Referring initially to FIG. 1, a preferred embodiment of the Lateral Canthotomy and Cantholysis Simulation Device of the present invention is shown and generally designated 100. The Lateral Canthotomy and Cantholysis Simulation Device 100 having a base 120 (shown in detail in FIGS. 2 and 3) covered by a skin covering 102.

The skin covering 102 depicts an upper right corner of a human face, including a partial forehead 122, brow 116, partial cheek 124, and partial nose 118. The bottom lid 110 and upper lid 114 of the skin covering 102 form an eye opening 104 where the simulated eye 112 is partially exposed. While a preferred embodiment of the Lateral Canthotomy and Cantholysis Simulation Device 100 includes a skin covering 102 that shows only a portion of a face, any portion of the human face may be used, so long as it includes a simulated eye 112 or any depiction of the human eye and area immediately surrounding the human eye.

The skin covering 102 is made of synthetic skin material, including but not limited to, silicone, rubber or neoprene. The skin covering 102 is used to simulate a realistic patient in both touch and sight, and may be pigmented to make the skin covering 102 more realistic. The skin covering 102 may be made of multiple layers to simulate various layers that comprise human skin. In addition, the skin covering 102 may include various simulated injuries, including, but not limited to, scrapes, cuts, burns, wounds, etc.

In a preferred embodiment, the skin covering 102 includes a preformed incision 108 at the lateral corner of the simulated eye 112, where the upper lid 114 and lower lid 110 of the skin covering 102 meet. The preformed incision 108 is used to simulate the incision made at the lateral corner of a patient's eye. The adhesive strip 105 holds the preformed incision 108 together and gives the user the opportunity to simulate cutting the lateral corner without having to replace the skin covering 102 after a single use. Adhesive strip 105 can made of a variety of materials, including, but not limited to, plastic, silicone, paper, etc. The adhesive strip 105 also need not be adhesive. For example, the adhesive strip 105 may be made of Velcro® and the skin covering 102 may have a corresponding Velcro® area around the preformed incision 108.

After the simulated lateral canthotomy and cantholysis is performed, the adhesive strip 105 can be removed, discarded, and replaced with a new adhesive strip 105. Although shown with a preformed incision 108, the Lateral Canthotomy and Cantholysis Simulation Device 100 of the present invention may not have a preformed incision 108, allowing the user to perform the lateral canthotomy directly on the skin covering 102.

In the preferred embodiment, the Lateral Canthotomy and Cantholysis Simulation Device 100 also includes a first band 144 (shown in FIG. 6) having a first end attached to an anchor 106, which in the preferred embodiment is formed to resemble simulated debris, and a second end formed with holes 145 (shown in FIG. 8). It is contemplated that the anchor 106 may be formed to resemble various other objects such as skin, hair, and wounds. The first band 144 in simulates the canthal tendon.

Figure 2:
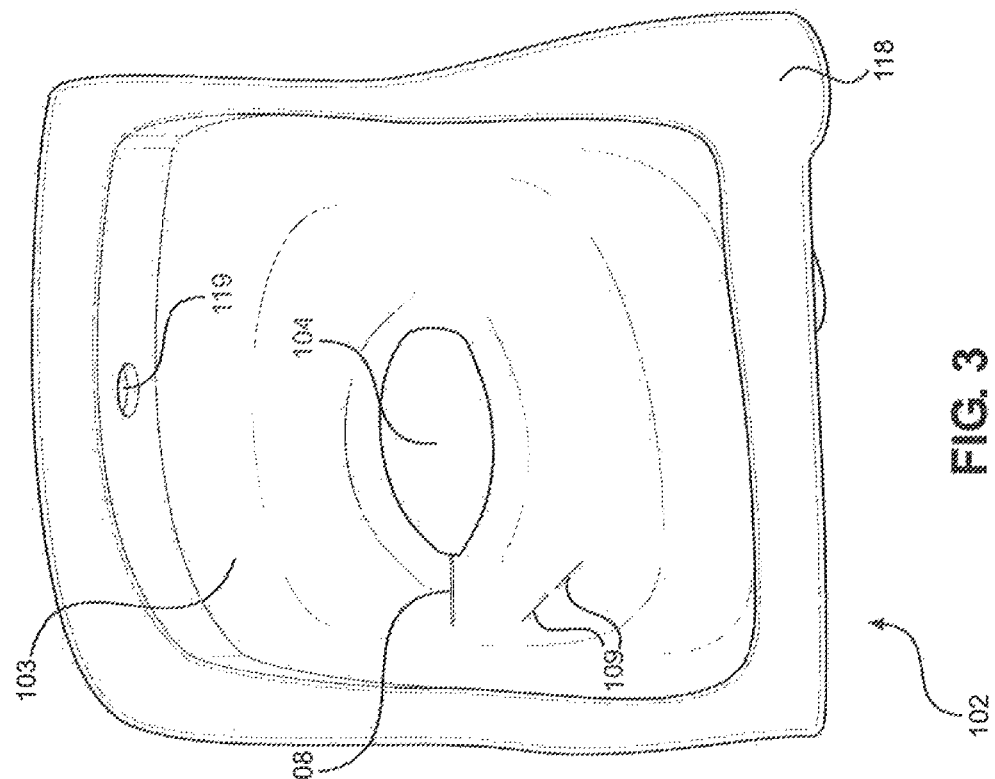
FIG. 2 is a front view of the simulated skin covering of the Lateral Canthotomy and Cantholysis Simulation Device of the present invention, showing an eye opening, simulated skin covering, upper and lower eyelids, brow, partial nose, partial forehead, partial cheek, preformed incision with an adhesive covering, and two (2) openings.
Figure 3:
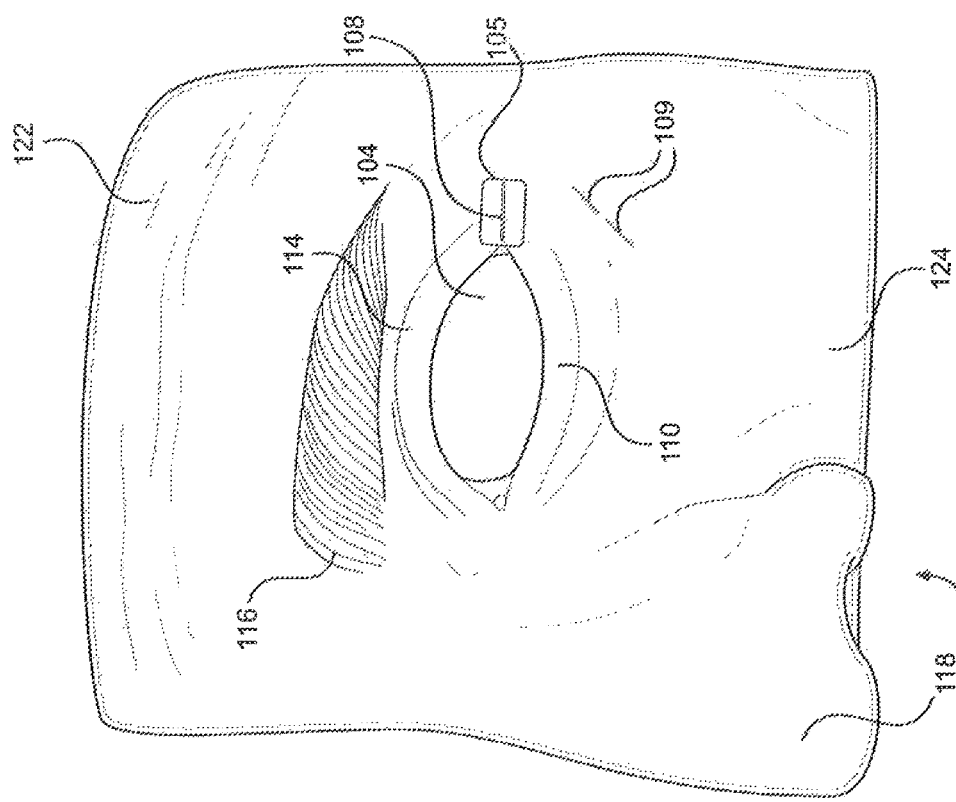
FIG. 3 is a back view of the simulated skin covering of the Lateral Canthotomy and Cantholysis Simulation Device of the present invention, showing the partial nose, eye opening, indent, preformed incision and two openings.

FIGS. 2 and 3 show the skin covering 102 of the Lateral Canthotomy and Cantholysis Simulation Device 100 of the present invention.

As stated above and shown in FIG. 2, the skin covering 102 includes a preformed incision 108 at the lateral corner of the simulated eye 112 where the upper lid 114 and lower lid 110 of the skin covering 102 meet. The preformed incision 108 is used to simulate the incision made at the lateral corner of a patient's eye during a lateral canthotomy. In addition to the preformed incision 108, the skin covering 102 of the Lateral Canthotomy and Cantholysis Simulation Device 100 of the current invention is formed with two (2) openings 109. The openings 109 correspond to a rectangular opening 134 on base 120 and a circular opening 132 on base 120, which will be subsequently discussed in FIGS. 4-9.

FIG. 3 is a back view of the skin covering 102 showing the perspective view of the interior 103 of skin covering 102. Skin covering 102 is shown with openings 109, preformed incision 108, and eye opening 104. The interior sides of skin covering 102 are formed with three (3) indents 119 that correspond to three (3) detents 123 on base 120 (shown in FIGS. 4 and 5). The indents 119 and detents 123 temporarily secure skin covering 102 to base 120 as described below.

Referring now to FIG. 4, the base 120 of the Lateral Canthotomy and Cantholysis Simulation Device 100 of the current invention is shown. The base 120 is substantially square in shape and can be made of various materials including, but not limited to, plastic, wood, silicone, etc. Base 120 has a front side 125 and a back side 140 (shown in FIG. 6). In a preferred embodiment of the Lateral Canthotomy and Cantholysis Simulation Device 100 of the present invention, base 120 also consists of four peripheral sides 141. While FIG. 4 depicts base 120 as substantially square, base 120 can be any shape or size.

On the front side 125 of base 120 is a depression 130 formed to receive the simulated eye 112 (as shown in FIG. 1) much in the same way the orbit of the skull receives a human eye. The front side 125 of base 120 is also formed with a brow ridge 128 and partial nose ridge 126 similar to that of a human skull to provide structure to the skin covering 102 that covers the base 120. The base 120 may be formed with other structures depending on the size of base 120 and may be designed to mimic the human skull to give the Lateral Canthotomy and Cantholysis Simulation Device 100 of the present invention a more realistic appearance.

The base 120 is also formed with two openings, one (1) rectangular 134 and one (1) circular 132. The rectangular opening 134 and circular opening 132 are located to the bottom right of the depression 130 on front side 125 of the base 120. While FIG. 4 depicts the base 120 as having two openings, multiple opening may be used or one (1) opening may be used.

Three detents 123 are located on the peripheral sides 141 of base 120. As stated above, the detents 123 are received by corresponding indents 119 located on the inside surface of the skin covering 102 and used to secure the skin covering 102 to base 120.

FIG. 5 shows the back side 140 of base 120. The rectangular opening 134 and circular opening 132 are visible. The back side 140 of base 120 also has a bore 136 and peg 138 located in the upper right corner. The peg 138 extends from the side of bore 136. The bore 136 and peg 138 provides a mounting point for the holes 145 of the band 144 on the backside 140 of the base 120. The location of bore 136 and peg 138 is not meant to be limiting and it is contemplated that the location of bore 136 and peg 138 may be located in various locations on the back 140 of the base 120 while still providing a mounting point for the band 144.

Referring now to FIG. 6-11, an assembled Lateral Canthotomy and Cantholysis Simulation Device 100 is shown without skin covering 102 for clarity purposes.

Figure 6:
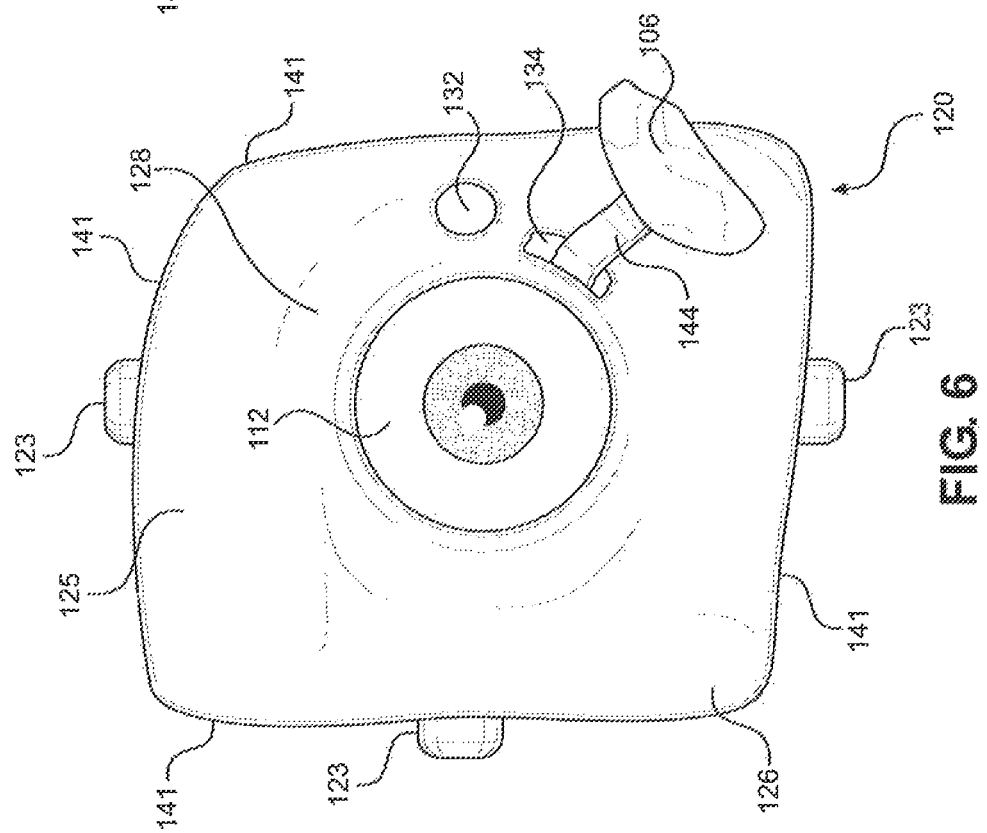
FIG. 6 is a front view of the base of the Lateral Canthotomy and Cantholysis Simulation Device of the present invention, showing the brow bridge, nose bridge, simulated eye within the depression, circular opening, rectangular opening, a band inserted through the rectangular opening and attached to simulated debris, and detents.

Looking first at FIG. 6, the front 125 of base 120 is shown with a simulated eye 112 attached to depression 130. Any mechanisms known in the art may be used for the attachment of eye 112 to depression 130 including, but not limited to, Velcro®, adhesive, welding, etc. In addition, as shown in FIG. 1, the skin covering 102 partially covers the simulated eye 112 and thus, the simulated eye 112 need not be attached to depression 130. Rather, simulated eye 112 can be placed in depression 130 and skin covering 102 acts as a means to hold simulated eye 112 to base 120.

The first band 144 is used to simulate the canthal tendon. The first band 144 may be made of any material known to those skilled in the art, including, but not limited to, rubber, plastic, neoprene, latex, etc. In a preferred embodiment, the first band is made of a flexible material capable of providing a tension to simulate the tension of the canthal tendon.

The first band 144 is attached at one end to the anchor, or simulated debris 106. The simulated debris 106 should be of an appropriate size and shape in order to prevent the first band 144 from being pulled completely through the opening 109 of the skin covering 102 (shown in FIG. 2) and the rectangular opening 132 of base 120. First band 144 is formed with several holes 145. Multiple holes 145 may be formed into first band 144 or only one (1) hole 145 may be formed.

Figure 7:
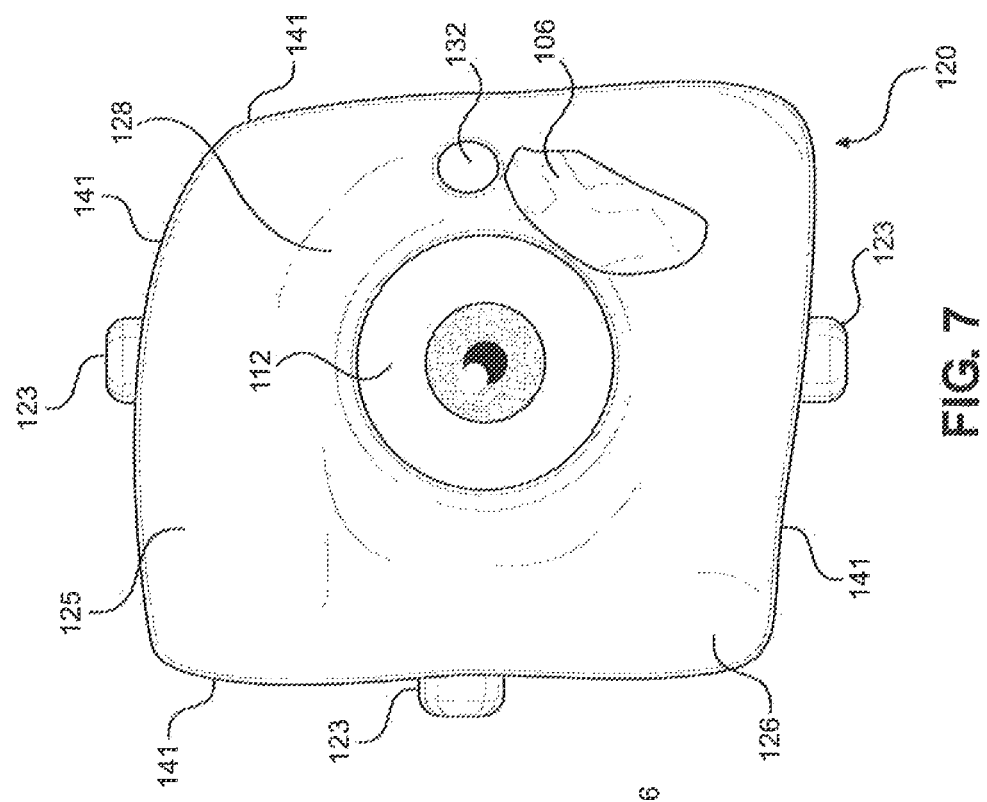
FIG. 7 is a front view of the base of the Lateral Canthotomy and Cantholysis Simulation Device of the present invention, showing the brow bridge, nose bridge, simulated eye within the depression, circular hole, rectangular hole, simulated debris against the base, and detents.

As shown in FIG. 7, the end of first band 144 that is not attached to simulated debris 106 is threaded through rectangular opening 134 on the front side 125 of base 120. The simulated debris 106 acts as an anchor, not allowing the first band 144 to be pulled entirely through the rectangular opening 134. When using a preferred embodiment of the Lateral Canthotomy and Cantholysis Simulation Device 100 of the present invention, the simulated debris 106 is against the skin covering 102.

As shown in FIG. 8, first band 144 is threaded through the rectangular opening 134 on the front side 125 of base 120. First band 144 exits the rectangular opening 134 on the back side 140 of base 120. First band 144 is then stretched and then secured to peg 138 using holes 145 on first band 144. Although in a preferred embodiment of the Lateral Canthotomy and Cantholysis Simulation Device 100 of the present invention the first band 144 is secured via a peg 138 located in bore 136, any mechanism known in the art to secure first band 144 may be used.

Figure 11:
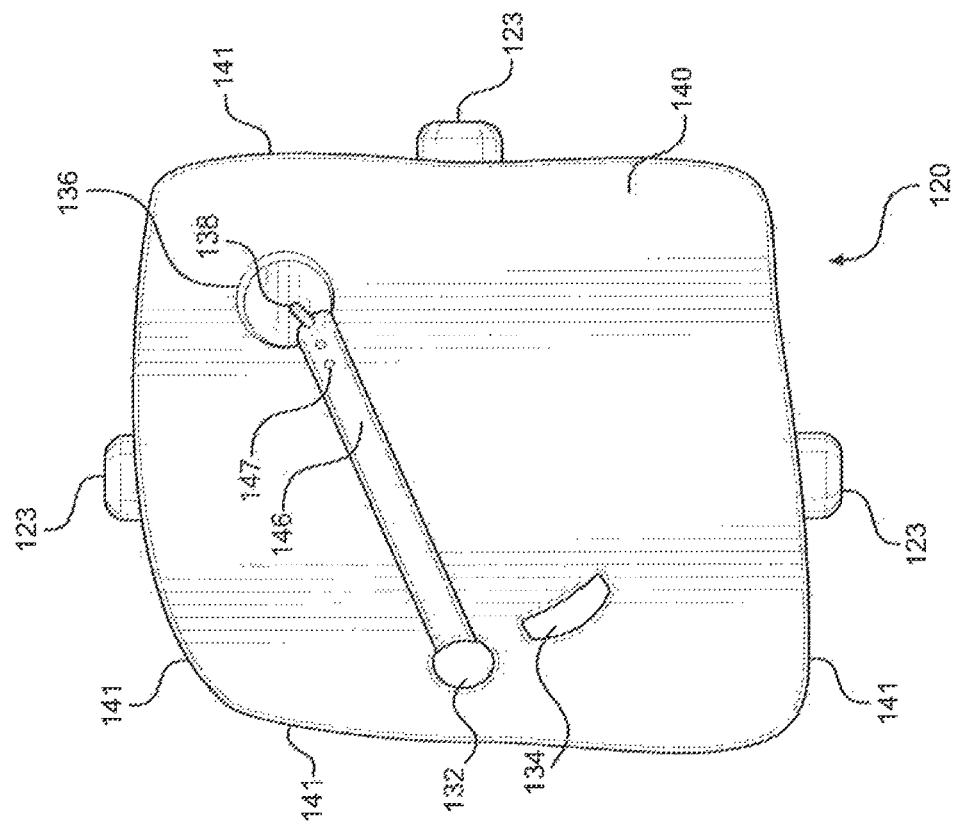
FIG. 11 is a back view of the base of the Lateral Canthotomy and Cantholysis Simulation Device of the present invention, showing the circular opening, rectangular opening, detents, bore, and second band exiting the circular opening and formed with holes received by the peg.
Figure 10:
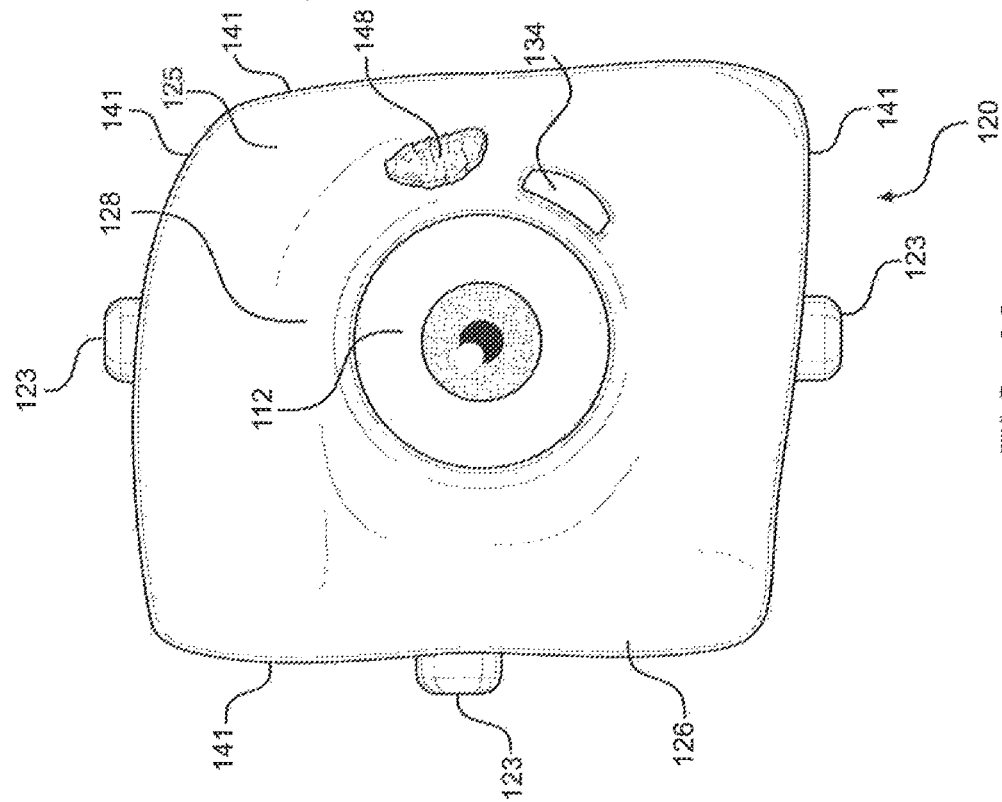
FIG. 10 is a front view of the base of the Lateral Canthotomy and Cantholysis Simulation Device of the present invention, showing the brow bridge, nose bridge, simulated eye within the depression, rectangular opening, simulated debris against the base, and detents.

FIGS. 9-11 describe a similar method of operating the Lateral Canthotomy and Cantholysis Simulation Device 100 of the present invention, in which a second band 146 is used to tether an alternative anchor, or simulated debris 148 closer to simulated eye 112. Again, the skin covering 102 is removed for clarity.

Referring first to FIG. 9, the second band 146 is attached to simulated debris 148 at one end. Here, the simulated debris 148 is depicted as a piece of glass. While in FIG. 9 the simulated debris 148 is depicted as a piece of glass, any form of simulated debris 148 may be used. The simulated debris 148 is used to anchor the second band 146 and second band 146 acts to tether simulated debris 148 to the base 120 and skin covering 102. Thus, the simulated debris 148 should be of an appropriate size and shape in order to prevent the simulated debris 148 and second band 146 from being pulled completely through the opening 109 (shown in FIG. 2) of the skin covering 102 and the circular opening 132 of base 120. As stated above, circular opening 132 may be any shape or size, thus, second band 146 may be any corresponding size so long as the second band 146 can pass through opening 109 on skin covering 120 and circular opening 132 on base 102.

The end of second band 146 that is not attached to simulated debris 148 is threaded through circular opening 132 on the front side 125 of base 120. The second band 146 acts to tether the simulated debris 148 to the front 125 of base 120, as shown in FIG. 10. When using a preferred embodiment of the Lateral Canthotomy and Cantholysis Simulation Device 100 of the present invention, the simulated debris 148 is tethered against the skin covering 102.

Referring now to FIG. 11, after threading second band 146 through circular opening 132, the second band 146 is stretched in order to create tension. Second band 146 is formed with several holes 147. Multiple holes 147 or only one (1) hole 147 may be formed into second band 146. After second band 146 is stretched to provide sufficient tension, second band 146 is secured to peg 138 using holes 147 on second band 146. As stated above, while in a preferred embodiment of the Lateral Canthotomy and Cantholysis Simulation Device 100 of the present invention the second band 146 is secured via a peg 138 located in bore 136, any mechanism known in the art to secure second band 146 may be used.

While base 120 is shown in FIGS. 2-9 as having two (2) openings, rectangular opening 134 and circular opening 132, any shape or size opening may be used. The purpose of both the rectangular opening 134 and circular opening 132 is to provide locations where the first band 144 or second band 146 may be cut to simulate cantholysis of the inferior tendon. Whether a rectangular opening 134, a circular opening 132, or either one alone are used, there should be a corresponding opening 109 in skin cover 102 (as shown in FIG. 2).

Figure 13:
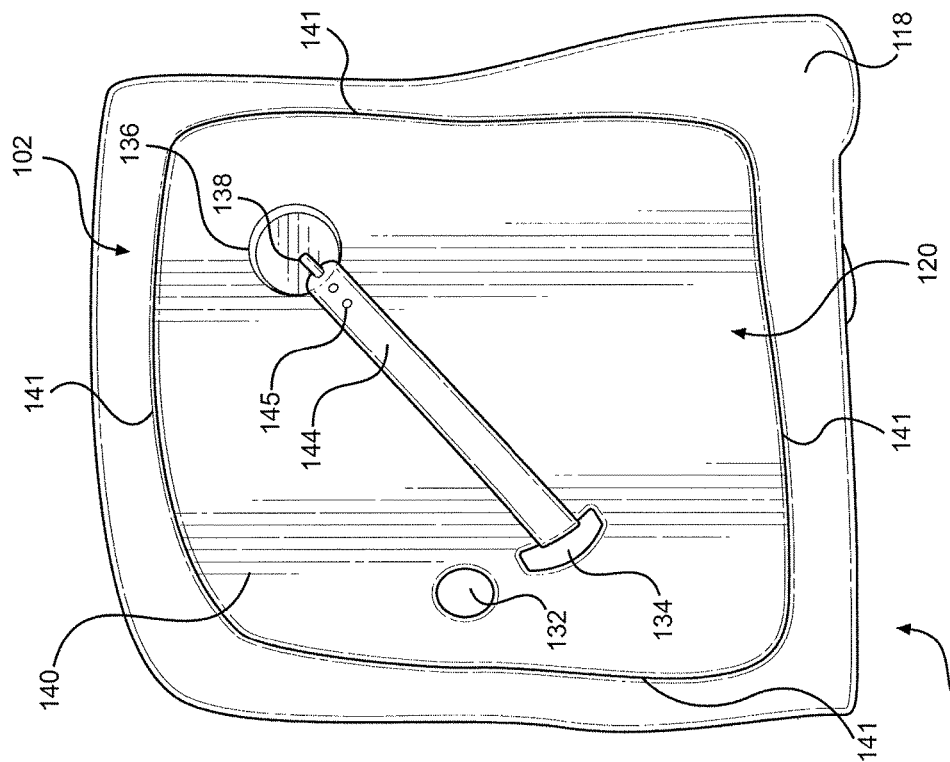
FIG. 13 is a back view of the Lateral Canthotomy and Cantholysis Simulation Device of the present invention, showing the skin covering, back of base, circular opening, rectangular opening, bore, and band exiting the rectangular opening and formed with holes received by a peg.
Figure 12:
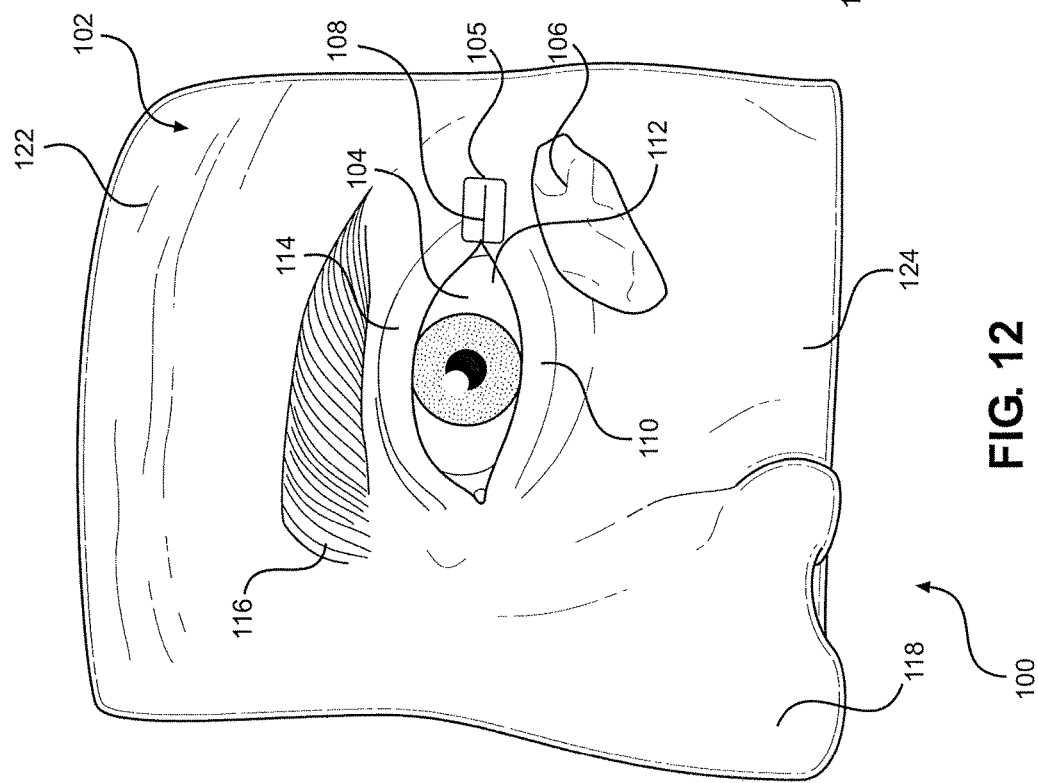
FIG. 12 is a front view of the Lateral Canthotomy and Cantholysis Simulation Device of the present invention, showing a simulated eye, skin covering, upper and lower eyelids, brow, partial nose, partial forehead, partial cheek, preformed incision with an adhesive covering, and simulated debris.

Referring to FIG. 12, in conjunction with FIG. 13, the Lateral Canthotomy and Cantholysis Simulation Device 100 of the present invention is shown. To use, simulated eye 112 is placed and attached to depression 130 formed into base 120, as discussed in FIG. 6. Simulated eye covering 102 is placed over base 120 and temporarily secured by the indents 119 (shown in FIG. 3) of skin covering 102 receiving the corresponding detents 123 (shown in FIG. 6) on base 120. In addition, an adhesive strip 105 is placed over the preformed incision 108.

To simulate the canthal tendon, first band 144 is threaded through opening 109 (shown in FIG. 2) on skin covering 102 and through the rectangular opening 134 on the front side 125 on base 120 as described in FIGS. 4 and 5. The first band 144 exits the rectangular opening 134 on the back side 140 of base 102, is pulled to create tension, and then secured on peg 138 using holes 145 formed into first band 144.

To perform the simulated lateral canthotomy and cantholysis, the user would first examine the simulated eye 112 and surrounding area of the skin covering 120 as one would examine a real patient. Next, the user could simulate the use of anesthetics by injecting numbing agents into the area surrounding the simulated eye 112. The user would then use hemostats, if available, along the preformed incision 108 and adhesive strip 105 to simulate clamping blood vessels awaiting ligation.

To perform the lateral canthotomy, the user uses tweezers (not shown) to slightly pull away the lower lid 110 of the skin covering 102 and cut the adhesive strip 105 along the preformed incision 108 using blunt tipped scissors, if available. This simulates the lateral canthotomy, which is performed by cutting horizontally from the lateral part of the eyelid to the bony margin of the orbital rim. This is approximately a 1 cm cut.

To simulate performing a cantholysis, the user would take the tweezers to pull the lower eyelid 110 away from the skin covering 102. Pulling the lower eyelid 110 away from base 120, would expose first band 144 in a tensioned state. The user then uses the same scissors to cut first band 144, simulating the cutting of the lateral canthal tendon. The same procedure would be used if the second band 146 were used with the circular opening 132.

After the simulated lateral canthotomy and cantholysis is performed, the adhesive strip 105 is removed and discarded. Because the first band 144 and adhesive strip 105 can be used, discarded, and replaced with a new first band 144 and adhesive strip 105, the Lateral Canthotomy and Cantholysis Simulation Device 100 of the present invention can be used repeatedly without requiring replacement of skin covering 102, base 120, or simulated eye 112.

Figure 14:
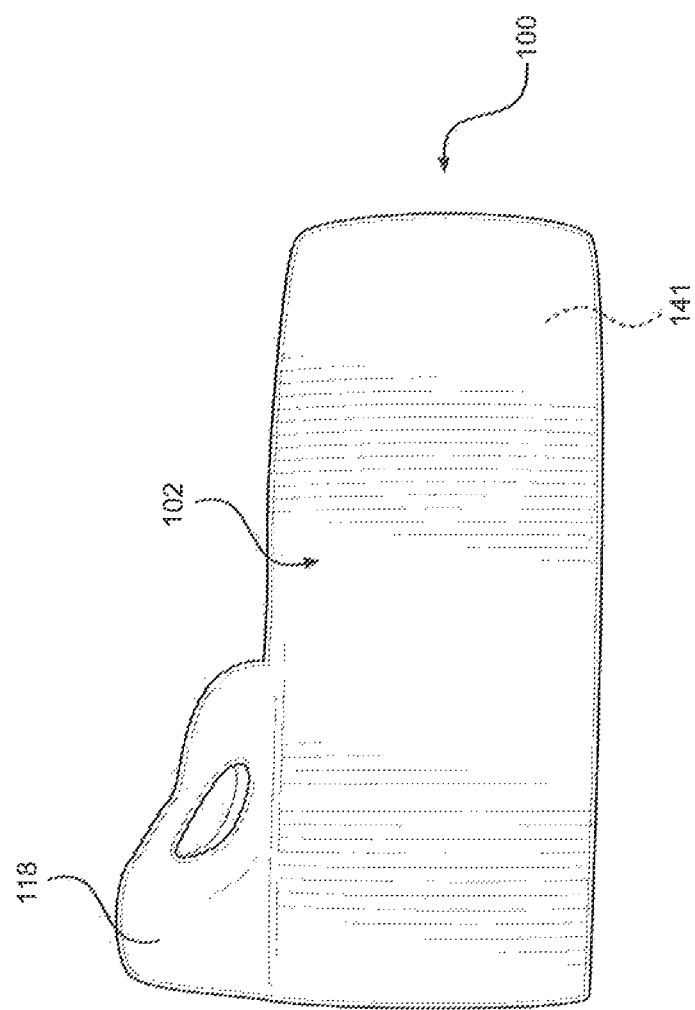
FIG. 14 is a bottom view of the Lateral Canthotomy and Cantholysis Simulation Device of the present invention, showing the peripheral sides of the skin covering and the bottom of the partial nose.

FIG. 14 shows the bottom of the lateral Canthotomy and Cantholysis Simulation Device 100 of the present invention. The skin covering 102 covers the peripheral sides 141 of base 120 (shown in FIG. 4). Although FIG. 14 depicts the skin covering 102 as covering the peripheral sides 141 of base 120, the skin covering 102 may not cover the peripheral sides 141 of base 120 if a different mechanism is used to secure skin covering 102 to base 120.

An alternative embodiment of the Lateral Canthotomy and Cantholysis Simulation Device of the present invention is shown in FIGS. 15-22 and generally designated 200. The alternative embodiment of the Lateral Canthotomy and Cantholysis Simulation Device 200 of the present invention does not use simulated debris 146 and 148, as described in previous embodiments.

FIGS. 15 and 16 shows the skin covering 202 of the alternative embodiment of the Lateral Canthotomy and Cantholysis Simulation Device 200 of the present invention.

As shown in FIG. 15, the skin covering 202 depicts an upper right corner of a human face, including a partial forehead 222, brow 216, partial cheek 224, and partial nose 218.

The skin covering 202 includes a preformed incision 208 at the lateral corner of the simulated eye 212 where the upper lid 214 and lower lid 210 of the skin covering 202 meet. The preformed incision 208 is used to simulate the incision made at the lateral corner of a patient's eye during a lateral canthotomy.

FIG. 16 is a back view of the skin covering 202 showing a perspective view of the interior 203 of skin covering 202 with the preformed incision 208 and eye opening 204. The interior sides of skin covering 202 are formed with three (3) indents 219 that correspond to three (3) detents 223 on base 220 (shown, for example, in FIG. 17). The indents 219 and detents 223 temporarily secure skin covering 202 to base 220 as described below.

Figure 21:
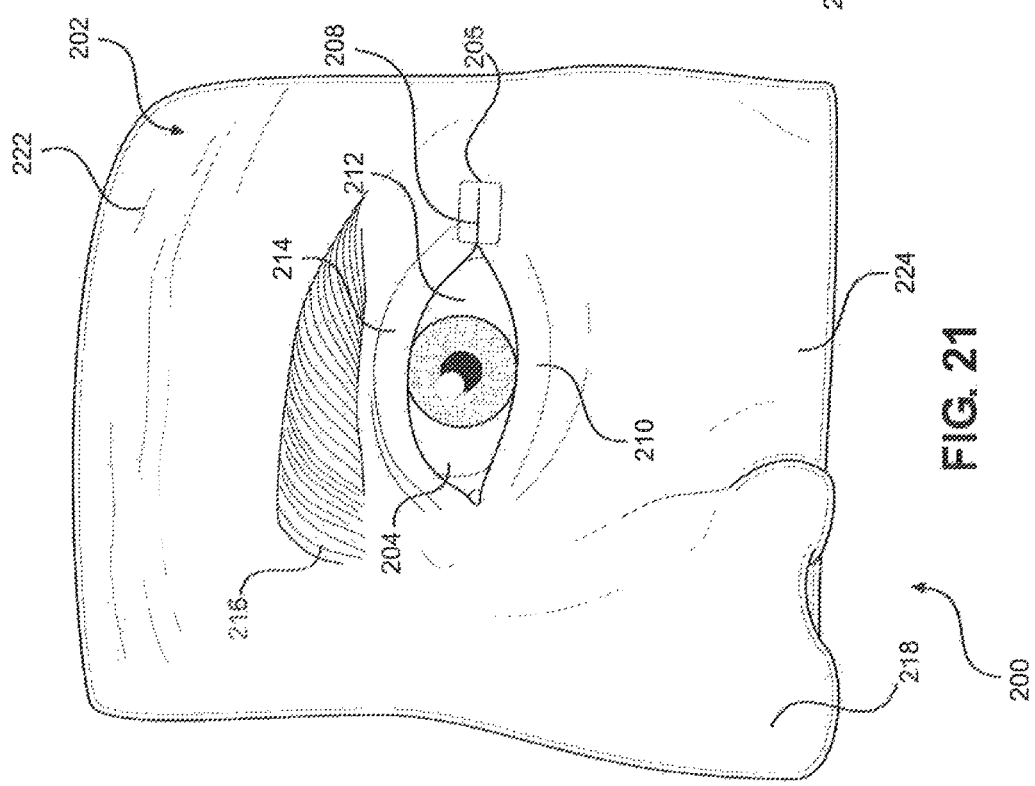
FIG. 21 is a front view of the assembled alternative embodiment of the Lateral Canthotomy and Cantholysis Simulation Device of the present invention, showing a simulated eye, the skin covering formed with a partial nose, brow, partial cheek, partial forehead, upper lid, lower lid, preformed incision, and adhesive strip.

Referring now to FIG. 17, the base 220 of the alternative embodiment of the Lateral Canthotomy and Cantholysis Simulation Device 200 of the current invention is shown. The base 220 is substantially square in shape and can be made of various materials including, but not limited to, plastic, wood, silicone, etc. While FIG. 17 depicts base 220 as substantially square, the base 220 can be any shape or size. Base 220 may be used to simulate a cantholysis without the use of skin covering 202. However, if base 220 is covered by skin covering 202 (as shown in FIG. 21), the shape and size of base 220 is dependent on skin covering 202.

Base 220 has a front side 225 and back side 240 (shown in FIG. 16). Base 220 also consists of four peripheral sides 241. While FIG. 17 depicts base 220 as substantially square, base 220 can be any shape or size. However, while base 220 may be used without skin covering 202, if base 220 is covered by skin covering 202, the shape and size of base 220 is dependent on skin covering 202. In addition, base 220 may be any color, or may be designed to visually mimic the tissue under the skin.

On the front side 225 of base 220 is a depression 230 formed to receive the simulated eye 212 (as shown in FIG. 19). The front 225 of base 220 is also formed with a brow ridge 228 and partial nose ridge 226 similar to that of a human skull, to provide structure to the skin covering 202 that covers the base 220 and to give a more realistic appearance.

The base 220 is also formed with one (1) rectangular opening 234 located on the bottom left of the depression 230 on the front 225 of the base 220. While FIG. 17 depicts the base 220 as having a rectangular opening 234, the opening may be any shape or size. Also on the front 225 of base 220 is a front bore 238 and front peg 236 located on the bottom right corner of depression 230. The peg 236 is located on the inside rim of bore 238. Referring briefly to FIG. 19, the rectangular opening 234 and front bore 238 should be located on the base 220 so that the band 244 is suspended between rectangular opening 234 and front bore 238, where the band 244 partially lays on the simulated eye 212. The band 244 should be positioned so that it is completely covered by lower lid 210, although this is not required for use.

Referring back to FIG. 17, three (3) detents 223 are located on the peripheral sides 241 of base 220. The detents 223 are received by corresponding indents 219 located on the inside peripheral surface of the skin covering 202 (shown in FIG. 16) and used to secure the skin covering 202 to base 220. Although the mechanism used to temporarily secure skin covering 202 to base 220 are detents 223 and indents 219, any mechanism that is known in the art to temporarily secure skin covering 202 to base 220 may be used.

FIG. 18 shows the back side 240 of base 220. The rectangular opening 234 is visible. The back 240 of base 220 has a rear bore 237 and a rear peg 239 located in the upper left corner of base 220. The rear bore 237 and rear peg 239 provides a mounting point for the holes 245 of the band 244 on the backside. The location of the rear bore 237 and rear peg 239 is not meant to be limiting and it is contemplated that the location of the rear bore 237 and rear peg 239 may be located in various locations on the back 240 of the base 220 while still providing a mounting point for the band 244.

Referring again to FIG. 19, the front 225 of base 220 is shown with a simulated eye 212 attached to the depression 230. A variety of different mechanisms known in the art may be used to attach simulated eye 212 to depression 230 including, but not limited to Velcro, adhesives, welding, etc. In addition, because the skin covering 202 partially covers the simulated eye 212 the simulated eye 212 need not be attached to depression 230. Rather, simulated eye 212 can be placed in depression 230 and skin covering 202 acts as a means to hold simulated eye 212 to base 220.

As shown in FIG. 19 and FIG. 20, band 244 is formed with holes 245 located on each end of the band 244. Multiple holes 245 may exist on each end of band 244 or only one (1) hole 245 may be formed into each end of band 244. One end of band 244 is secured on the front peg 236 using the holes 245. The opposite end of the band 244 is threaded through the rectangular opening 243 through the front side 225 of base 220. The band 244 lay across the simulated eye 212 in order to simulate the inferior crus of the lateral canthal tendon.

As shown in FIG. 20, the band 244 exits through rectangular opening 243 out the back side 240 of base 220 and is secured by rear peg 239 using holes 245. Although a preferred embodiment of the Lateral Canthotomy and Cantholysis Simulation Device 200 of the present invention uses a rear peg 239 and rear bore 237 to secure band 244, any mechanism known in the art may be used without deviating from the spirit and scope of the invention.

Figure 22:
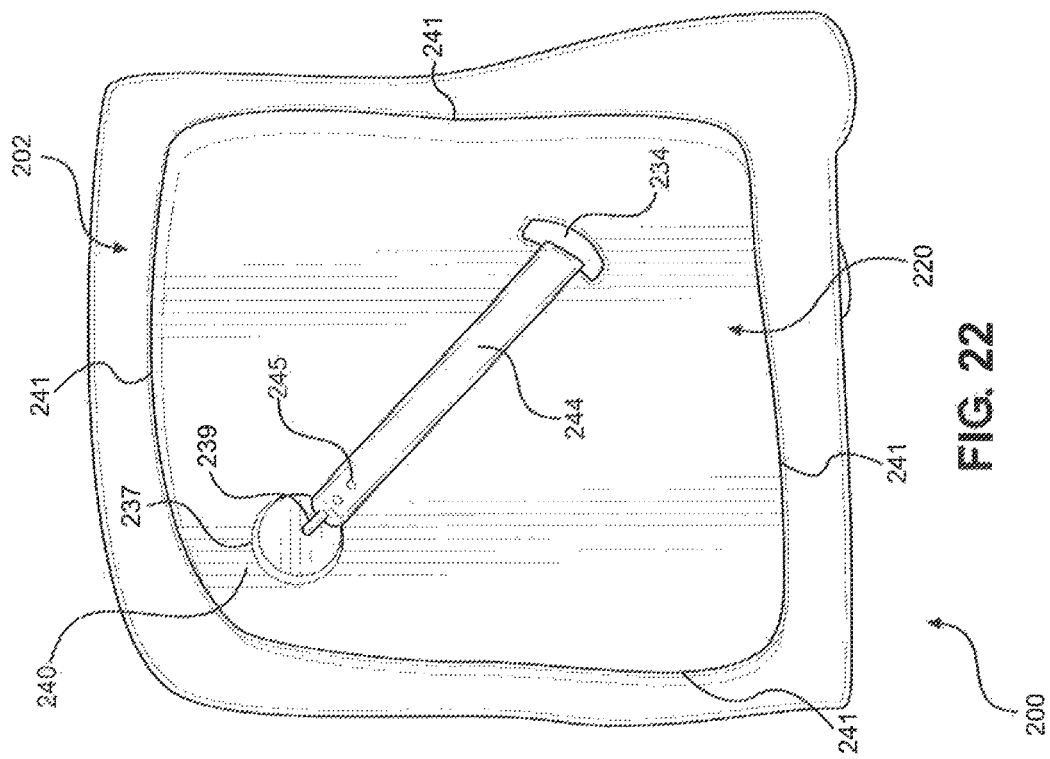
FIG. 22 is a back view of the assembled alternative embodiment of the Lateral Canthotomy and Cantholysis Simulation Device of the present invention, showing the skin covering, rectangular opening, bore, and band exiting the rectangular opening and formed with holes received by rear peg.

In FIG. 21, the alternative embodiment of the Lateral Canthotomy and Cantholysis Simulation Device 200 of the present invention is shown. After band 234 has been secured as described above, skin covering 202 is placed over base 220 and temporarily secured by the indents 219 of the skin covering 202 receiving the corresponding detents 223 on base 220. In addition, an adhesive strip 205 is placed over the preformed incision 208. FIG. 22 shows the back of the assembled alternative embodiment of the Lateral Canthotomy and Cantholysis Simulation Device 200 of the present invention. Skin covering 202 covers the peripheral sides 241 of base 220, but does not cover the back side 240 of base 220.

Figure 23:
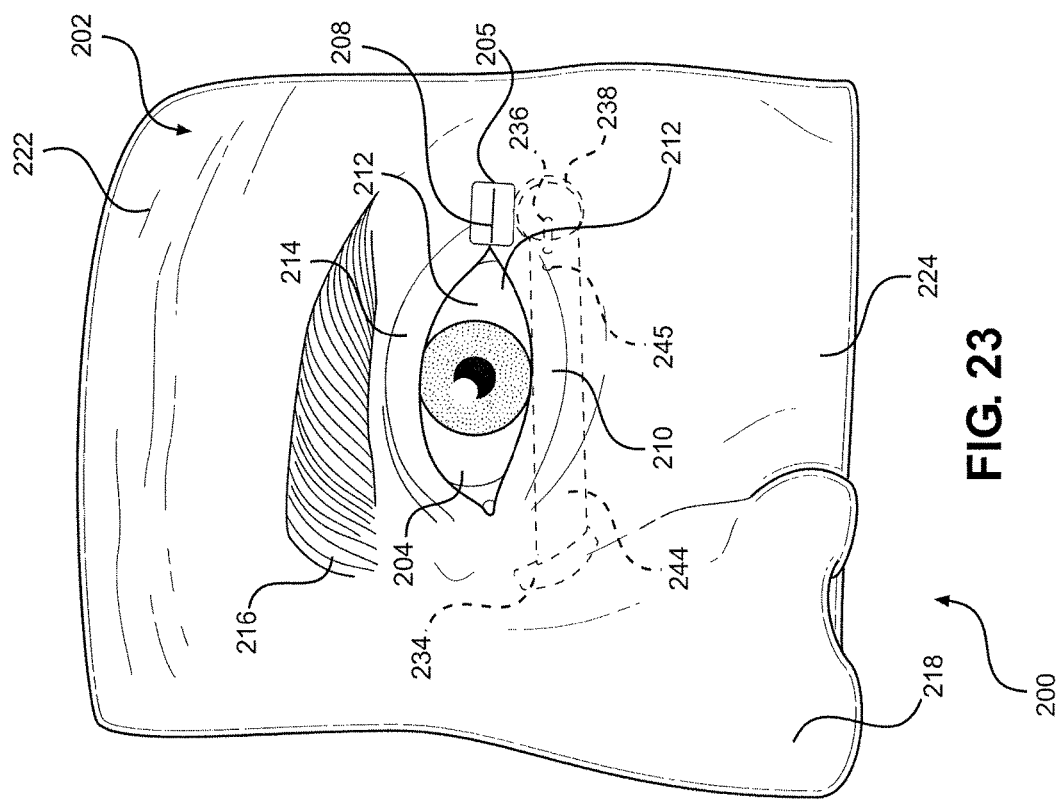
FIG. 23 is a front view of the assembled alternative embodiment of the Lateral Canthotomy and Cantholysis Simulation Device of the present invention, showing the rectangular opening, front bore, and band formed with notches received by front peg in dashed lines.

FIG. 23 shows an assembled alternative embodiment of the Lateral Canthotomy and Cantholysis simulation device of the present invention with the rectangular opening 234, band 244 holes 245, front bore 238, and front peg 236 located under the skin covering 202 and depicted in dashed lines to show their position underneath the skin covering 202.

To perform the simulated lateral canthotomy and cantholysis using the alternative embodiment of the Lateral Canthotomy and Cantholysis Simulation Device 200 of the present invention, the user would first examine the simulated eye 212 and surrounding area of the skin covering 202 as one would examine a real patient. Next, the user could use a numbing agent to simulate the numbing of the area surrounding the simulated eye 212. The user would then use hemostats, if available, along the preformed incision 108 and adhesive strip 205 to simulate clamping blood vessels awaiting ligation.

To perform the lateral canthotomy, the user uses tweezers (not shown) to slightly pull away the lower lid 210 of the skin covering 202 from simulated eye 212 and cut the adhesive strip 205 along the premade incision 208 using blunt tipped scissors, if available. This simulates the lateral canthotomy, which is performed by cutting horizontally from the lateral part of the eyelid to the bony margin of the orbital rim. The incision is approximately 1 cm in length.

Figure 24:
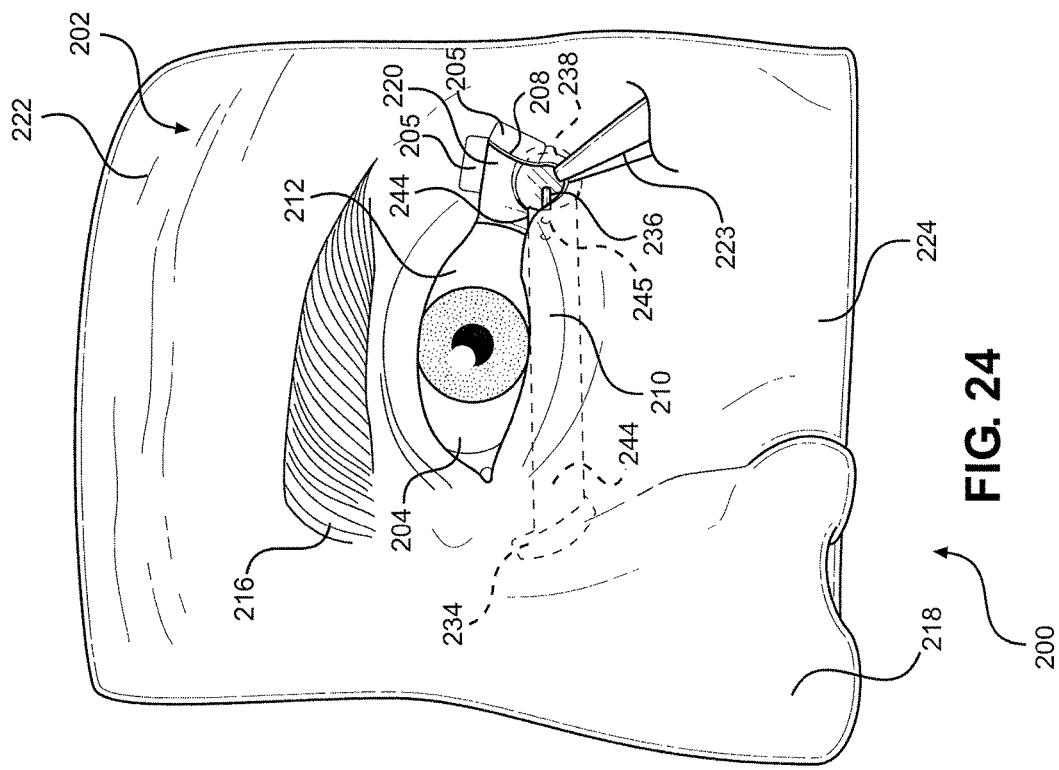
FIG. 24 is a front view of the assembled alternative embodiment of the Lateral Canthotomy and Cantholysis Simulation Device of the present invention, showing the alternative embodiment of the Lateral Canthotomy and Cantholysis Simulation Device of the present invention after simulated lateral canthotomy, but prior to simulated cantholysis, with the adhesive strip cut and the preformed incision peeled back from the base using tweezers.

To simulate performing a cantholysis, as depicted in FIG. 24, the user would take the tweezers 223 and gently peel back the lower lid 210 of the skin covering 202 at the preformed incision 208, exposing the band 244 underneath skin covering 202. The other hand of the user (not shown) would use scissors (not shown), to cut the exposed band 244. Cutting the band 244 simulates the cutting of the lateral canthal tendon.

After the simulated lateral canthotomy and cantholysis is performed, the adhesive strip 208 and band 244 are removed and discarded. Because the band 244 and adhesive strip 108 can be used, discarded, and replaced with a new band 244 and adhesive strip 208, the alternative embodiment of the Lateral Canthotomy and Cantholysis Simulation Device 200 of the present invention can be used repeatedly without requiring replacement of skin covering 202.

FIGS. 25 and 26 show possible variations of a preferred embodiment of the Lateral Canthotomy and Cantholysis Simulation Device 100 of the present invention and the alternative embodiment of the Lateral Canthotomy and Cantholysis Simulation Device 200 of the present invention, respectively. In FIG. 25, the Lateral Canthotomy and Cantholysis Simulation Device 100 of the present invention shows the skin covering 102 with simulated injuries 150 and simulated debris 148. In FIG. 26, the alternative embodiment of the Lateral Canthotomy and Cantholysis Simulation Device 200 is shown with an area simulating a burn 250.

While there have been shown what are presently considered to be preferred embodiments of the present invention, it will be apparent to those skilled in the art that various changes and modifications can be made herein without departing from the scope and spirit of the invention.

I claim:

1. A lateral conthotomy and cantholysis simulation device comprising:
   a base;
   a skin covering removably placed over said base;
   a band having a first end and a second end, said band is removably attached to said base; and
   wherein said band is under tension between said first end and said second end to simulate a canthal tendon.

2. The lateral conthotomy and cantholysis simulation device of claim 1, wherein said base comprises a front, a back, a peripheral edge, and at least one base opening through said base.

3. The lateral conthotomy and cantholysis simulation device of claim 2, wherein said base further comprises a bore with an attached peg.

4. The lateral conthotomy and cantholysis simulation device of claim 3, wherein said base further comprises a depression formed to receive a simulated eye.

5. The lateral conthotomy and cantholysis simulation device of claim 4, wherein said skin covering comprises an eye opening, an upper lid, and a lower lid, wherein said eye opening corresponds to said depression of said base to expose said simulated eye.

6. The lateral conthotomy and cantholysis simulation device of claim 5, wherein said band further comprises an anchor attached to said first end of said band and a plurality of holes adjacent said second end of said band wherein said holes are sized to fit said peg, said anchor is placed over said skin covering and said band penetrates through said skin covering to be removably attached to said peg; and
   wherein said band is under tension between said first end attached to said anchor and said second end removably attached to said peg to simulate the canthal tendon.

7. The lateral conthotomy and cantholysis simulation device of claim 6, wherein said skin covering further comprises at least one skin covering opening, wherein said band penetrates said skin covering through said at least one skin covering opening.

8. The lateral conthotomy and cantholysis simulation device of claim 7, wherein said skin covering further comprises a preformed incision at a junction between said upper lid and said lower lid.

9. The lateral conthotomy and cantholysis simulation device of claim 8, wherein said skin covering further comprises an incision strip removably attached to skin covering over said preformed incision.

10. The lateral conthotomy and cantholysis simulation device of claim 5, wherein said base further comprises a second bore with a second attached peg.

11. The lateral conthotomy and cantholysis simulation device of claim 10, wherein said band further comprises a plurality of holes adjacent said to said first end of said band and a plurality of holes adjacent said second end of said band, wherein said plurality of holes on said first end of said band is removably attached to said bore with attached peg and said plurality of holes on said second end of said band is removably attached to said second bore with attached peg; and wherein said band is under tension between said first end removably attached to said bore with attached peg and said second end removably attached to said second bore with attached peg to simulate the canthal tendon.

12. The lateral conthotomy and cantholysis simulation device of claim 11, wherein said skin covering further comprises a preformed incision at a junction between said upper lid and said lower lid.

13. The lateral conthotomy and cantholysis simulation device of claim 12, wherein said skin covering further comprises an incision strip removably attached to skin covering over said preformed incision.

14. A lateral conthotomy and cantholysis simulation device comprising:
- a base comprising a front, a back, a peripheral edge, and a depression to receive a simulated eye;
- a skin covering comprising an eye opening, an upper lid, and a lower lid, wherein said skin covering is removably placed over said base and said eye opening corresponds to said depression of said base to expose said simulated eye;
- a band having a first end and a second end, said band is removably attached to said base; and
- wherein said band is under tension between said first end and said second end to simulate a canthal tendon.

15. The lateral conthotomy and cantholysis simulation device of claim 14, wherein said skin covering further comprises a preformed incision at a junction between said upper lid and said lower lid and an incision strip removably attached to skin covering over said preformed incision.

16. The lateral conthotomy and cantholysis simulation device of claim 14, wherein said base further comprises a bore with an attached peg.

17. The lateral conthotomy and cantholysis simulation device of claim 16, wherein said band further comprises an anchor attached to said first end of said band and a plurality of holes adjacent said second end of said band wherein said holes are sized to fit said peg of said bore with attached peg, said anchor is placed over said skin covering and said band penetrates through said skin covering to be removably attached to said bore with attached peg; and wherein said band is under tension between said first end attached to said anchor and said second end removably attached to said bore with attached peg to simulate the canthal tendon.

18. The lateral conthotomy and cantholysis simulation device of claim 16, wherein said base further comprises a second bore with a second attached peg.

19. The lateral conthotomy and cantholysis simulation device of claim 18, wherein said band further comprises a plurality of holes adjacent to said first end of said band and a plurality of holes adjacent said second end of said band, wherein said plurality of holes on said first end of said band is removably attached to said bore with attached peg and said plurality of holes on said second end of said band is removably attached to said second bore with attached peg; and wherein said band is under tension between said first end removably attached to said bore with attached peg and said second end removably attached to said second bore with attached peg to simulate the canthal tendon.

20. A lateral conthotomy and cantholysis simulation device comprising:
- a base comprising a front, a back, a peripheral edge, and a depression to receive a simulated eye;
- a skin covering comprising an eye opening, an upper lid, a lower lid, and a preformed incision at a junction between said upper lid and said lower lid, wherein said skin covering is removably placed over said base and said eye opening corresponds to said depression of said base to expose said simulated eye;
- a band having a first end and a second end, said band is removably attached to said base under said skin covering; and
- wherein said band is under tension between said first end and said second end to simulate a canthal tendon.

* * * * *